(12) United States Patent
Chen et al.

(10) Patent No.: US 7,620,021 B1
(45) Date of Patent: Nov. 17, 2009

(54) METHOD, BASE STATION AND MOBILE STATION FOR TIMESLOT SELECTION AND TIMESLOT ASSIGNMENT

(75) Inventors: Lan Chen, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 301 days.

(21) Appl. No.: 09/703,719

(22) Filed: Nov. 2, 2000

(30) Foreign Application Priority Data

Nov. 4, 1999 (JP) .................................. 11-314417
Dec. 15, 1999 (JP) .................................. 11-356645

(51) Int. Cl.
*H04J 3/00* (2006.01)

(52) U.S. Cl. .................. 370/337; 370/321; 370/322; 370/329; 370/341; 370/347; 370/348

(58) Field of Classification Search ................. 370/280, 370/294, 329, 337, 341, 347, 348, 349, 442, 370/321, 322
See application file for complete search history.

(56) References Cited

U.S. PATENT DOCUMENTS

| | | | |
|---|---|---|---|
| 5,280,630 A | | 1/1994 | Wang |
| 5,384,777 A | * | 1/1995 | Ahmadi et al. .............. 370/337 |
| 5,434,858 A | | 7/1995 | Shimada |
| 5,594,720 A | * | 1/1997 | Papadopoulos et al. ..... 370/330 |
| 5,903,843 A | | 5/1999 | Suzuki et al. |
| 6,041,046 A | * | 3/2000 | Scott et al. .................. 370/319 |
| 6,115,390 A | * | 9/2000 | Chuah ........................ 370/443 |
| 6,424,645 B1 | * | 7/2002 | Kawabata et al. ........... 370/347 |
| 6,760,877 B1 | * | 7/2004 | Lappetelainen et al. ..... 714/748 |

FOREIGN PATENT DOCUMENTS

| | | |
|---|---|---|
| EP | 0 533 648 A2 | 1/1993 |
| EP | 0 837 616 | 4/1998 |
| EP | 0 935 353 | 8/1999 |
| GB | 2 322 524 | 8/1998 |

(Continued)

OTHER PUBLICATIONS

Siemens, TSGR1#6(99)a79, XP-002247227, pp. 1-7, "Physical Layer Measurements in Utra TDD Mode", Aug. 30, 1999.

(Continued)

*Primary Examiner*—William Trost, IV
*Assistant Examiner*—Toan D Nguyen
(74) *Attorney, Agent, or Firm*—Oblon, Spivak, McClelland, Maier & Neustadt, L.L.P.

(57) ABSTRACT

A timeslot selection method is provided. The timeslot selection method includes the steps of: obtaining a propagation loss; receiving an occupation state and an interference amount of an uplink timeslot; obtaining a desired wave power from the propagation loss; obtaining a ratio between the desired wave power and the propagation loss for the uplink timeslot in which the occupation state is idle; and selecting the transmitting timeslot by using the ratio. In addition, a timeslot assignment method in which there are a plurality of TDD boundaries each of which is a boundary between at least an uplink timeslot and at least a downlink timeslot in a frame is provided. Furthermore, a timeslot assignment method is provided, in which assignment is carried out according to a service class included in a QoS request.

12 Claims, 29 Drawing Sheets

FOREIGN PATENT DOCUMENTS

| | | |
|---|---|---|
| JP | 63-180229 | 7/1988 |
| JP | 5-292019 | 11/1993 |
| JP | 6-112875 | 4/1994 |
| JP | 7-30527 | 1/1995 |
| JP | 8-23567 | 1/1996 |
| JP | 8-237732 | 9/1996 |
| JP | 10-75488 | 3/1998 |
| JP | 10-79970 | 3/1998 |
| JP | 10-126847 | 5/1998 |
| JP | 10-341474 | 12/1998 |
| JP | 11-69431 | 3/1999 |
| JP | 11-136743 | 5/1999 |
| JP | 11-196455 | 7/1999 |
| JP | 11-298398 | 10/1999 |
| WO | WO 98/53559 | 11/1998 |
| WO | WO 99/26430 | 5/1999 |

OTHER PUBLICATIONS

T. H. Le, et al., IEEE, Vehicular Technology Conference, XP-010342022, pp. 123-127, "A MAC Protocol for Asymmetric Multimedia Traffic With Prioritized Services in Local Wireless ATM Networks", May 16, 1999.

J. Jiang, et al., The Ninth IEEE International Symposyum, Personal, Indoor, and Mobile Radio Communications, XP-010314607, pp. 1355-1359, "An Efficient Media Access Control Protocol for Delay Sensitive Bursty Data in Broadband Wireless Networks", Sep. 8, 1998.

C. Mihailescu, et al., IEEE, Vehicular Technology Conference, XP-010342115, pp. 1737-1741, "Dynamic Resource Allocation for Packet Transmission in UMTS TDD TD-CDMA Systems", May 16, 1999.

* cited by examiner

FIG. 3

| BIT CONFIGURATION | PROPAGATION LOSS(dB) |
|---|---|
| 0000000 | −13 OR LESS |
| 0000001 | −12 |
| 0000010 | −11 |
| ⋮ | ⋮ |
| 1111110 | 114 |
| 1111111 | 115 |

FIG. 4

| BIT CONFIGURATION | INTERFERENCE LEVEL (dBm) |
|---|---|
| 00000000 | −295 OR LESS |
| 00000001 | −294 |
| 00000010 | −293 |
| ⋮ | ⋮ |
| 11111110 | −40 |
| 11111111 | −39 |

METHOD, BASE STATION AND MOBILE STATION FOR TIMESLOT SELECTION AND TIMESLOT ASSIGNMENT

BACKGROUND OF THE INVENTION

1. Field of the Invention

The present invention relates to a technique wherein a plurality of mobile stations access a base station randomly for performing packet transmission in a cellular system which uses radio waves of the same frequency repetitively.

Further, the present invention relates to a timeslot assignment method in a TDD system for mobile communications, a base station and a mobile station using the method.

2. Description of the Related Art

It is well known that random access controlled by a base station is necessary for preventing throughput reduction caused by collisions of packets which are sent simultaneously from a plurality of mobile stations when the mobile stations access a base station randomly.

As a conventional random access method, an ICMA-PE (Idle-Signal Casting Multiple Access with Partial Echo) method is proposed in Japanese patent application No. 1-240822. In the ICMA-PE method, a mobile station sends a signal after verifying that a timeslot is idle by checking a downlink notification signal.

More specifically, in the wireless communication method disclosed in the Japanese patent application No. 1-240822, a collision control field is added after a downlink information unit. The collision control field includes an Idle/Busy (I/B) bit, a Receive/Non-receive bit (R/N) and Partial Echo bits (PE). In addition, length information W is added before an uplink information unit. A mobile station sends the length information to a base station in an uplink communication. According to the length information W, the base station decides a number of units where I/B is presented. Other mobile station accesses a timeslot where I is indicated in the I/B field.

The above-mentioned conventional packet transmission method has defects in that adaptability to a cellular system where the same frequency waves are used repeatedly is low and that high throughput can not be obtained.

That is, in the cellular system, there are timeslots having low interference and timeslots having high interference according to a position or a transmission power of a mobile station which uses the same frequency in another cell. Thus, when a mobile station which is far from the base station accesses a timeslot having high interference among a plurality of available timeslots, desired CIR (Carrier-to-Interference Ratio) can not be obtained since receive level at the base station is lowered due to propagation loss. Therefore, transmission failure occurs and high throughput can not be obtained. In the above description, CIR is a ratio of a desired wave (carrier) power to an interference wave power. The larger the CIR is, the smaller interference to the desired wave is. Therefore, probability of transmission failure becomes small when CIR is large since interference amount of the desired wave becomes small.

In addition, when a plurality of mobile stations tries to send data, a collision occurs when the mobile stations tries to send data simultaneously by a timeslot which is detected first. Thus, the possibility that the base station does not receive the data becomes high and throughput reduces.

Further, since the possibility that an idle timeslot having high interference is used in an adjacent cell is high, when a mobile station located in the vicinity of the periphery of a cell accesses an idle timeslot having high interference, it provides high interference to a communication in the adjacent cell in addition that communication failure ratio becomes high.

These problems occur because selection of idle timeslots is not performed in the above-mentioned packet transmission method.

In another aspect of the related art, conventionally, in a TDD (Time Division Duplex) system wherein carriers are assigned to timeslots for communication, uplink and downlink timeslot configuration is symmetric. The reason is that uplink and downlink traffic is almost symmetric in voice communication.

As multimedia services become widespread, non-voice traffic is increasing. Thus, it is conceivable that various information providing services and applications for e-mail, information sending from users and the like will be used more and more in the future. From the viewpoint of traffic of the applications and services, since data distribution from a database may be main traffic in the information providing services, it can be considered that downlink traffic becomes large in the network. In the uplink direction, information traffic from users will increase. Therefore, in non-voice communication such as data and images, there will be many cases where uplink traffic and downlink traffic are asymmetrical.

In such cases, when symmetrical timeslot assignment is used in the TDD system in the same way as conventional voice communication, a following problem arises. If timeslots are provided in accordance with communication of a direction which sends larger traffic, timeslots for communication of another direction remain unused. If timeslots are provided in accordance with communication of a direction which sends smaller traffic, timeslots for communication of another direction is insufficient. As a result, information transmission having high serviceability and high efficiency can not be provided.

For overcoming such problems, in Lan Chen, Susumu Yoshida, Hidekazu Murata and Shouichi Hirose, "A dynamic timeslot assignment algorithm for asymmetric traffic in multimedia TDMA/TDD mobile radio", IEICE Trans. Fundamentals, vol. E81-A, pp. 1358-1366, no. 7, July 1998, a timeslot assignment method for asymmetric traffic is disclosed. In the conventional timeslot assignment method shown in this document, as shown in FIG. 1, one uplink/downlink timeslot switching boundary (TDD boundary) is provided in a frame. According to uplink and downlink traffic, the TDD boundary is moved within movable bounds. As shown in FIG. 1, although timeslots 4 and 5 are available, they can not be used as uplink. Thus, timeslots can not be used efficiently by this method.

In addition, control for accepting packet transmission is performed in the following according to the method in the above-mentioned document. When a mobile station sends a request timeslot number, which is a number of timeslots per one frame to be used for data transmission, to a base station, the base station tries to assign timeslots for the mobile station. At this time, when available timeslots is insufficient even if the TDD boundary is moved, the base station refuses data transmission. In addition, even when the number of timeslots which exist is larger than a number which is requested by the mobile station, a number of assigned timeslots is the same as the number which is requested. Further, when new available timeslots appear in data transmission and timeslots more than requested timeslots becomes available, the number of assigned timeslots is the same as the number which is requested.

As mentioned above, in the conventional timeslot assignment method, the TDD boundary is moved for adapting to asymmetrical uplink and downlink traffic. However, since there is only one boundary between uplink and downlink timeslots, when timeslots adjacent to the boundary are used, it is impossible to assign a downlink timeslot to an uplink timeslot area and to assign an uplink timeslot to a downlink timeslot area even when timeslots other than the timeslots adjacent to the boundary are released. Therefore, the released timeslots can not be utilized. Thus, the utilization of timeslot resources can not be maximized. As a result, frequency utilization efficiency is low, transmission delay becomes large, and in data transmission, transmission incompletion ratio becomes high.

In addition, when the number of idle timeslots is smaller than the number requested by a mobile station in the case of traffic congestion, the data transmission request is denied, and data is discarded or the mobile station wait for retransmission. Thus, data transmission incompletion ratio becomes high. In addition, transmission delay becomes large.

When the number of idle timeslot is larger than the number of requested timeslots during off-peak times, or, when new available timeslots appear during communication, it is possible to perform higher speed data transmission if the mobile station and the base station have means for data transmission using timeslots more than requested number or currently used timeslots. However, in the conventional technique, idle timeslots are not used actively. Thus, there is a problem that throughput is low.

SUMMARY OF THE INVENTION

A first object of the present invention is to provide a timeslot selection method and a wireless packet transmission system in which high throughput and low delay can be obtained in a cellular system.

A second object of the present invention is to provide an efficient and flexible timeslot assignment method in which asymmetric traffic can be accommodated, service quality is satisfied maximally and throughput is improved maximally.

The above first object of the present invention is achieved by a timeslot selection method of selecting a transmitting timeslot used by a mobile station in a wireless packet transmission system where the mobile station communicates with a base station, the timeslot selection method comprising the steps of:

obtaining a propagation loss;

receiving an occupation state and an interference amount of an uplink timeslot from the base station;

obtaining a desired wave (or carrier) power from the propagation loss;

obtaining a ratio between the desired wave power and the propagation loss for the uplink timeslot in which the occupation state is idle; and selecting the transmitting timeslot by using the ratio between the desired wave power and the propagation loss among uplink timeslots.

According to the above-mentioned invention, since a transmitting timeslot is selected by using the ratio between the desired wave power and the interference amount of each idle timeslot, an appropriate transmitting timeslots can be selected in consideration of the interference amount. Therefore, transmission failure can be decreased and high throughput and low delay can be realized.

In the above method, the step of selecting the transmitting timeslot may includes the step of:

selecting an idle timeslot which has the lowest ratio between the desired wave power and the propagation loss among idle timeslots each of which idle timeslots satisfies a predetermined ratio between desired wave power and propagation loss.

According to the above-mentioned invention, a timeslot which satisfies the ratio between the desired wave power and the interference amount can be selected. In addition, the conventional problem can be solved, in the conventional problem, a mobile station of low desired wave power may selects a timeslot of high interference since a mobile station near the base station may occupy a timeslot of low interference. Therefore, transmission failure can be decreased and high throughput and low delay can be realized.

The above-mentioned first object is also achieved by a mobile station in a wireless packet transmission system where the mobile station communicates with a base station, the mobile station comprising:

means for obtaining a propagation loss;

means for receiving an occupation state and an interference amount of an uplink timeslot from the base station;

means for obtaining a desired wave power from the propagation loss;

means for obtaining a ratio between the desired wave power and the propagation loss for the uplink timeslot in which the occupation state is idle; and means for selecting the transmitting timeslot by using the ratio between the desired wave power and the propagation loss among uplink timeslots.

The above-mentioned mobile station may includes means for selecting an idle timeslot which has the lowest ratio between the desired wave power and the propagation loss among idle timeslots each of which idle timeslots satisfies a predetermined ratio between desired wave power and propagation loss.

According to the above-mentioned invention, a mobile station applicable to the timeslot selection method can be provided.

The above-mentioned first object is also achieved by a base station in a wireless packet transmission system where the base station communicates with a mobile station, the base station comprising:

means for measuring an occupation state and an interference amount of an uplink timeslot; and means for sending the occupation state and the interference amount of the uplink timeslot to the mobile station.

In the above-mentioned base station may includes means for receiving a number of remaining information units and a propagation loss from the mobile station;

means for obtaining an interference amount by using the propagation loss and a receive level when the number of remaining information units is zero; and means for sending the interference amount to the mobile station.

According to the above-mentioned invention, a mobile station applicable to the timeslot selection method can be provided.

The above-mentioned first object is also achieved by a wireless packet transmission system comprising a mobile station and a base station where the mobile station communicates with the base station:

the mobile station comparing:

means for obtaining a propagation loss;

means for receiving an occupation state and an interference amount of an uplink timeslot from the base station;

means for obtaining a desired wave power from the propagation loss;

means for obtaining a ratio between the desired wave power and the propagation loss for the uplink timeslot in which the occupation state is idle; and means for selecting a transmitting timeslot by using the ratio between the desired wave power and the propagation loss, the base station comprising:

means for measuring the occupation state and the interference amount of the uplink timeslot; and means for sending the occupation state and the interference amount of the uplink timeslot to the mobile station.

In the wireless packet transmission system the means for selecting the transmitting timeslot in the base station may includes:

means for selecting an idle timeslot which has the lowest ratio between the desired wave power and the propagation loss among idle timeslots each of which idle timeslots satisfies a predetermined ratio between desired wave power and propagation loss.

According to the above-mentioned invention, a wireless packet transmission system applicable to the timeslot selection method can be provided.

The above-mentioned second object is achieved by a timeslot assignment method used for TDD in a mobile communication system, comprising the steps of:

providing a plurality of TDD boundaries each of which TDD boundaries is a boundary between at least an uplink timeslot and at least a downlink timeslot in a frame; and performing timeslot assignment.

The above-mentioned method may includes the step of:

changing the TDD boundary dynamically when waiting or when carrying out communication.

In the above-mentioned method, the TDD boundary may vary according to a predetermined condition.

According to the above-mentioned invention, since it becomes possible to assign uplink timeslots or downlink timeslots regardless of the position of idle timeslots, it can be prevented that useless timeslots may occur. Therefore, the above-mentioned second object can be achieved. The predetermined condition is, for example, the case when timeslots are released, the case of traffic congestion or a QoS level from a user. For example, when high QoS is requested by a user, many timeslots are assigned dynamically.

The above-mentioned second object is also achieved by a timeslot assignment method used for TDD in a mobile communication system which includes a base station and a mobile station, comprising the steps of:

the base station assigning at least a timeslot for a next frame in a frame time; and the base station sending information including information of timeslot assignment to the mobile station by using at least a control mini-slot.

According to this invention, since assignment information is represented by the control mini-slot, the mobile station can access timeslots according to the assignment information, and uplink/downlink timeslots for transmission can be assigned freely to idle timeslots.

The timeslot assignment method may includes the step of:

the base station receiving information including a desired number of timeslots in the frame time; and the base station assigning timeslots of the desired number from idle timeslots of the next frame.

The timeslot assignment method may includes the step of:

the base station receiving information including a desired number of timeslots in the frame time; and when the number of idle timeslots in the next frame is smaller than the desired number of timeslot, the base station assigning timeslots in which the number of the timeslots is smaller than the desired number of timeslots for the next frame within predetermined bounds.

The timeslot assignment method may includes the step of:

the base station receiving information including a desired number of timeslots in the frame time; and when the number of idle timeslots in the next frame is larger than the desired number of timeslots, the base station assigning timeslots in which the number of the timeslots is larger than the desired number of timeslots for the next frame within predetermined bounds.

The timeslot assignment method may includes the step of:

when at least an idle timeslot occurs during data transmission, the base station assigning timeslots in which the number of the timeslots is larger than a number of timeslots used for the data transmission within predetermined bounds.

The timeslot assignment method may includes the step of:

the base station assigning, during data transmission, timeslots in which the number of the timeslots is smaller than a number of timeslots used for the data transmission within predetermined bounds.

According to the above-mentioned invention, the number of timeslot assignment can be changed dynamically according to a request of a state of communication such that timeslots can be used effectively. The predetermined bounds are, for example, between the maximum number of timeslots which can be used and the minimum number of necessary timeslots.

In the timeslot assignment method, the control mini-slot may includes an assignment state of a timeslot, information for verifying that uplink data is received, allocated timeslot information for the next frame.

According to this invention, timeslots for use in the next frame can be reserved and the mobile station can verify that sent data is received by the base station.

The timeslot assignment method may includes the steps of:

service quality being classified to service classes; and the base station performing timeslot assignment according to the service class.

In the timeslot assignment method, a head packet in data which is sent to the base station from the mobile station may include a QoS request, the QoS request including a maximum number of timeslots which can be used for transmitting the data, a minimum number of timeslots and a service class, and the base station assigning timeslots of the maximum number or the minimum number according to the service class.

According to the above-mentioned invention, quality for data transmission can be changed according to a service class.

The above-mentioned second object is also achieved by a base station in a mobile communication system using a TDD method which includes the base station and a mobile station, comprising:

means for assigning at least a timeslot for a next frame in a frame time; and means for sending information including information of timeslot assignment to the mobile station by using at least a control mini-slot.

The base station may includes:

means for receiving information including a desired number of timeslots in the frame time; and means for assigning timeslots of the desired number from idle timeslots of the next frame.

The base station may includes:

means for receiving information including a desired number of timeslots in the frame time; and means for, when the number of idle timeslots in the next frame is smaller than the desired number of timeslots, assigning timeslots in which the number of the timeslots is smaller than the desired number of timeslots for the next frame within predetermined bounds.

The base station may includes:

means for receiving information including a desired number of timeslots in the frame time; and means for, when the number of idle timeslots in the next frame is larger than the desired number of timeslots, assigning timeslots in which the number of the timeslots is larger than the desired number of timeslots for the next frame within predetermined bounds.

The base station may includes:

means for, when at least an idle timeslot occurs during data transmission, assigning timeslots in which the number of the timeslots is larger than a number of timeslots used for the data transmission within predetermined bounds.

The base station may includes:

means for assigning, during data transmission, timeslots in which the number of the timeslots is smaller than a number of timeslots used for the data transmission within predetermined bounds.

In the base station, the control mini-slot may include an assignment state of a timeslot, information for verifying that uplink data is received, allocated timeslot information for the next frame.

The base station may includes:

means for performing timeslot assignment according to a service class which is included in a QoS request which is sent from the mobile station.

According to the above-mentioned invention, a base station applicable to the above-mentioned slot assignment method can be provided.

The above-mentioned second object is also achieved by a mobile station in a mobile communication system using a TDD method which includes the mobile station and a base station, comprising:

means for communicating with the base station which includes means for assigning at least a timeslot for a next frame in a frame time; and means for sending information including information of timeslot assignment to the mobile station by using at least a control mini-slot;

means for sending information which includes a QoS request by sending a head packet in data which is sent to the base station; and means for sending information by using at least an assigned timeslot which is notified of by the control mini-slot.

According to this invention, a mobile station applicable to the base station can be provided.

BRIEF DESCRIPTION OF THE DRAWINGS

FIG. 3 shows bit configurations for propagation loss;

FIG. 4 shows bit configurations for interference amount level;

DETAILED DESCRIPTION OF THE PREFERRED EMBODIMENTS

First Embodiment

In the following, an embodiment of the present invention corresponding to the first object will be described as a first embodiment.

Figure 1:
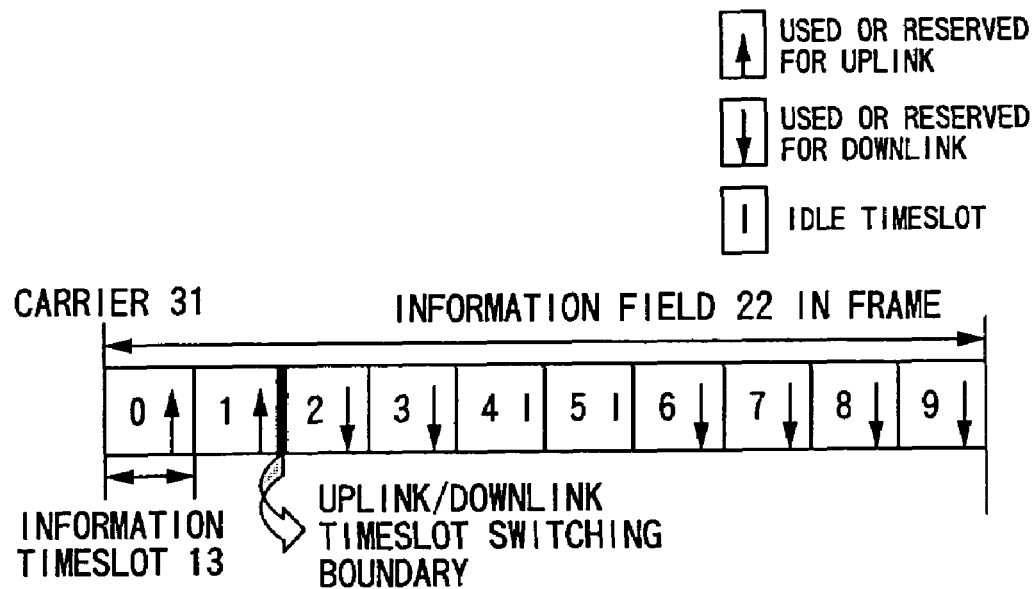
FIG. 1 is a figure for explaining an upward/downward timeslot switching boundary (TDD boundary) in a TDD system in a conventional technique.
Figure 2:
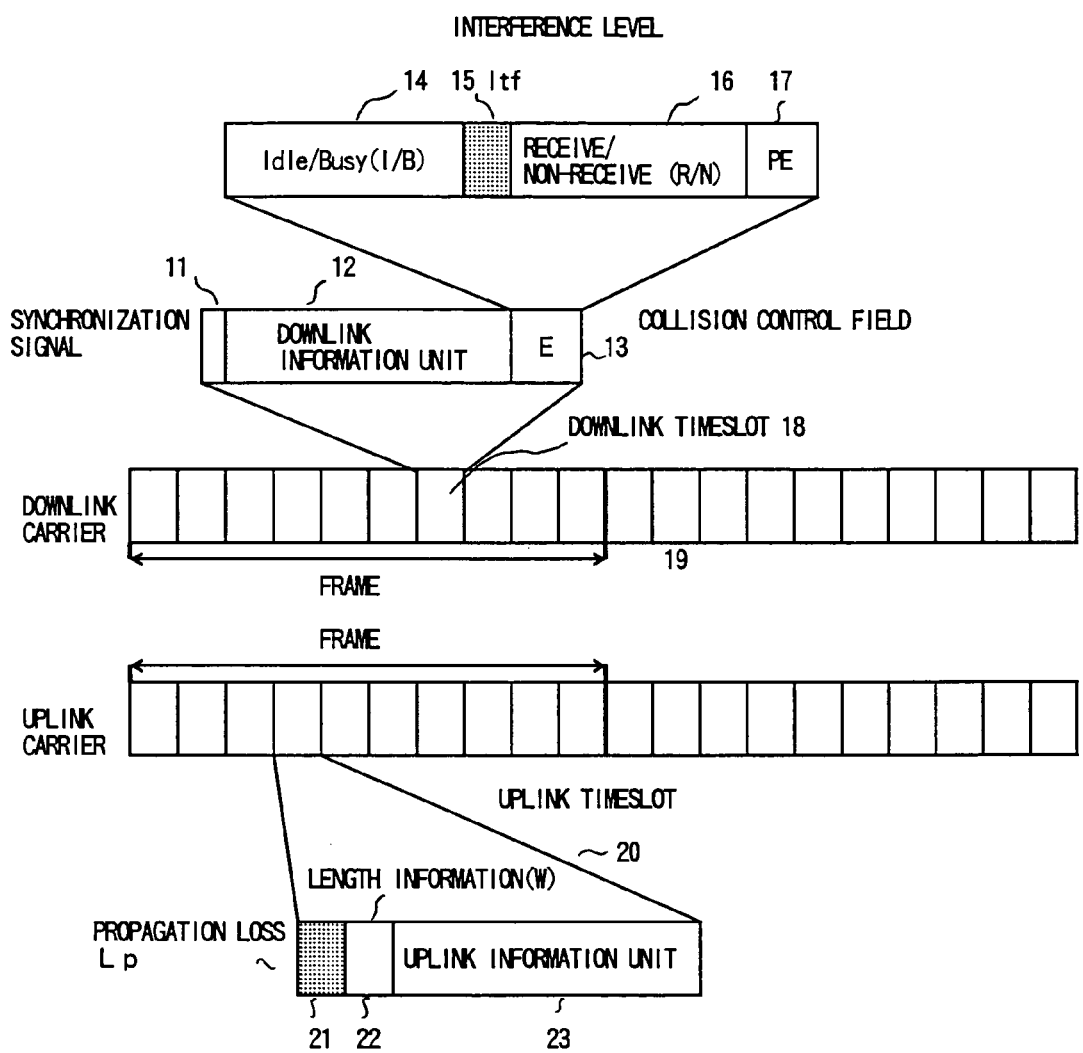
FIG. 2 shows a timeslot configuration according to a first embodiment of the present invention.

The present invention corresponding to the first object is applicable to TDMA and CDMA for an access method and is applicable to TDD and FDD for a duplex method. In the following, an embodiment in the case of TDMA/FDD will be described with reference to figures. interference FIG. 2 shows a timeslot configuration according to the first embodiment of the present invention. A carrier is divided into frames and the frame is divided into timeslots. As shown in a downlink timeslot 18 in the figure, a collision control field (E) 13 is added to each timeslot of the downlink carrier. The collision control field 13 includes Idle/Busy (I/B) bits 14, interference level (Itf) bits 15, receive/non-receive (R/N) bits 16, and partial echo bits 17. In an uplink timeslot 20, propagation loss (Lp) bits 21 and remaining information unit number (W) bits 22 are added to the head of the uplink information unit 23. The remaining information unit number (W) represents the number of remaining necessary frames on the precondition that one timeslot is used in one frame. When a plurality of timeslots are used simultaneously in one frame, the remaining information timeslot number W is added to each timeslot.

Each of the propagation loss (Lp) bits 21 and the interference level (Itf) bits 15 includes n bits such that enough accuracy is ensured.

To take an example of the propagation loss (Lp), assuming that range attenuation in a cell of 1-km radius adheres to fourth-power law, a dynamic range of the propagation loss is 106 dB which is from −13 dB to 93 db in consideration of shadowing of 6.5 dB standard deviation. Therefore, the propagation loss can be formed as 7 bits which can represent 128 classes as shown in FIG. 3.

As for the interference amount level Itf, when each of mobile stations (transmission power 0.1 W (20 dBm)) using the same timeslot is located at the end of adjacent cells which is nearest to an interference measuring base station, it is considered that the interference level becomes worst, which is 39 dBm. Therefore, the interference level Itf can be formed by 8 bits which represent 256 classes as shown in FIG. 4.

Next, methods for calculating the propagation loss Lp and calculating the interference level Itf will be described.

Assuming that a transmission power Pbt (dBm) of a base station and a transmission power Pmt a (dBm) of a mobile station are known to the base station and the mobile station. In addition, assuming that propagation losses of uplink and downlink are the same.

The mobile station calculates the propagation loss Lp as shown in a formula 1 by using a receive power Pmr (dBm) of a synchronization signal and the like.

$$Lp(dB)=Pbt(dBm)-Pmr(dBm) \qquad \text{(formula 1)}$$

The mobile station informs the base station of the remaining information unit length W and the propagation loss Lp by sending the uplink timeslot. The base station informs the mobile station of the interference level of an idle timeslot of a next frame by using the collision control field in the downlink timeslot. As for the idle timeslot of the next frame, there are two cases that the remaining information unit number W of the current timeslot is 0 or the current timeslot is idle. The interference level for each case is calculated as follows.

(1) For the case where the current timeslot is idle, the interference level is measured directly so that the interference level is obtained.

(2) For the case where the remaining information unit number W of the current timeslot is 0, the base station measures a receive power Pbr (dBm). Since the base station receives the propagation loss Lp from the mobile station, the base station calculates a desired wave power C (dBm) of the mobile station which sends the packet by the following formula 2. Therefore, the interference level Itf can be obtained by subtracting C from the receive level Pbr by the following formula 3.

$$C(dBm)=Pmt(dBm)-Lp(dB) \qquad \text{(formula 2)}$$

$$Itf=Pbr-C \qquad \text{(formula 3)}$$

As is described later, the mobile station which requested data transmission calculates the desired wave power C at the base station and predicts receive CIR of each idle timeslot for transmission by using the interference level Itf of an idle timeslot which is sent from the base station. The mobile station selects an idle timeslot which has an appropriate interference level such that the predicted CIR becomes the smallest in which the predicted CIR satisfies a required CIR.

The required CIR is a CIR which satisfies communication quality for providing a service and is decided according to the communication quality necessary for a providing service and application. As the CIR becomes larger than the required CIR, the probability of quality deterioration becomes smaller. However, when a mobile station using large desired wave power occupies a timeslot having small interference, a mobile station using small desired wave power tends to use a timeslot having large interference. Therefore, the probability of receive failure becomes high. Thus, in the present invention, the appropriate idle timeslot is selected such that the CIR becomes smallest in which the CIR satisfies the required CIR.

Figure 5:
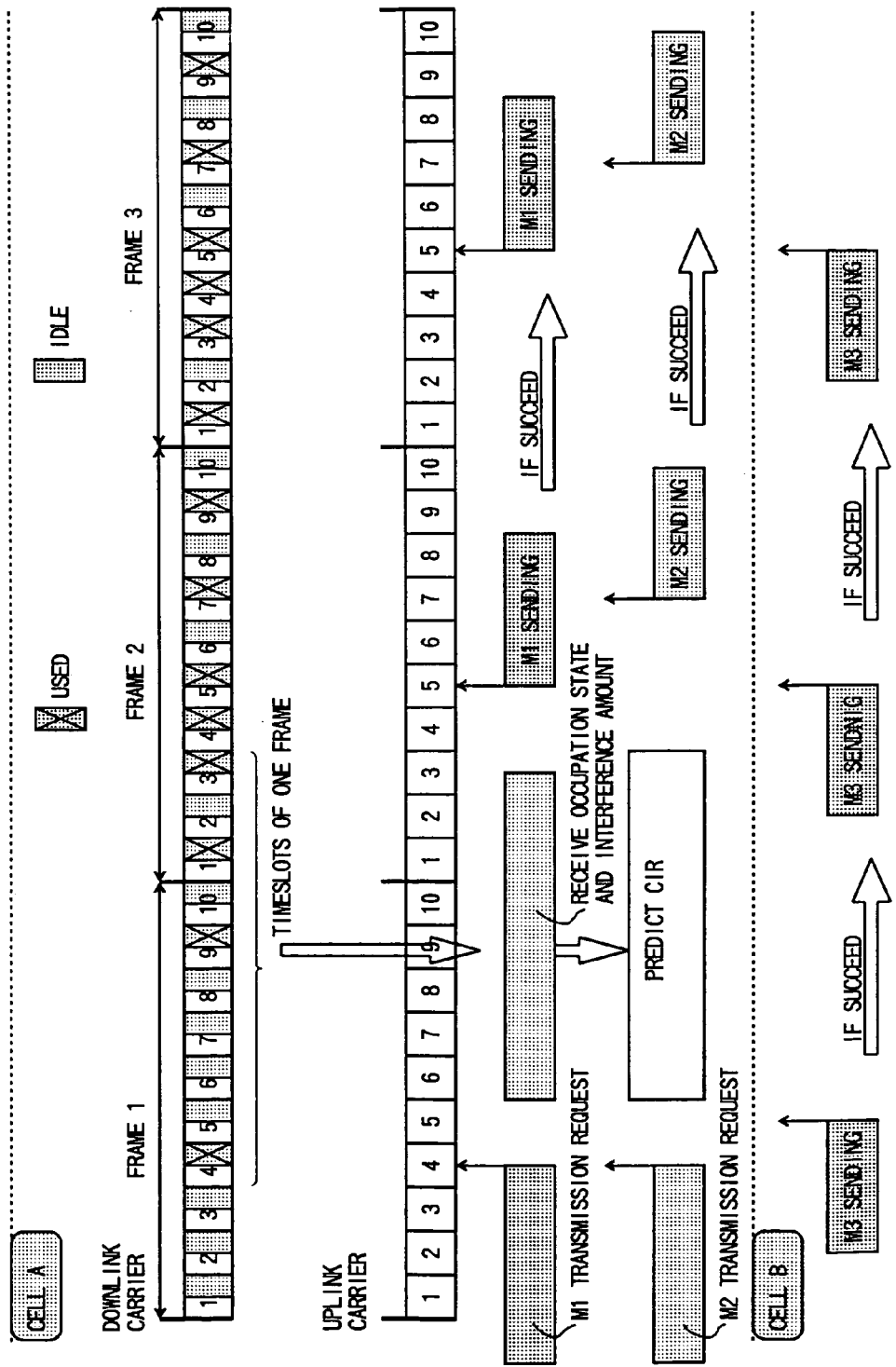
FIG. 5 shows a first example of an operation of timeslot allocation according to the first embodiment of the present invention.
Figure 6:
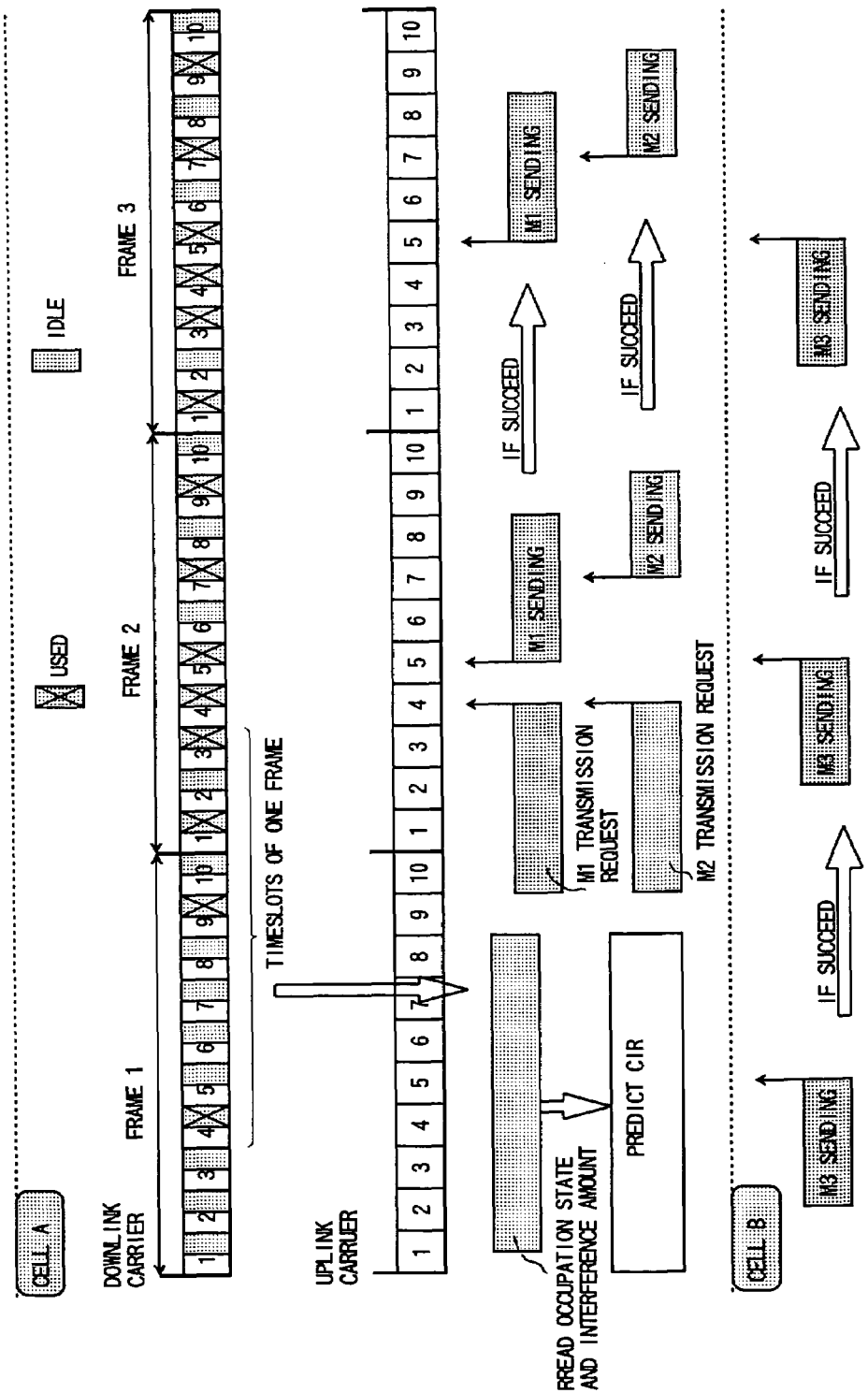
FIG. 6 shows a second example of an operation of timeslot allocation according to the first embodiment of the present invention.

FIGS. 5 and 6 are figures which show examples of operations of timeslot assignment according to the first embodiment of the present invention. In a first example shown in FIG. 5, the mobile station receives, from the base station, occupation states and interference amounts of timeslots of one frame beginning from the time of transmission request. For example, in the figure, a mobile station 1 (M1) sends a transmission request at the time of a timeslot 4 in a frame 1, and the mobile station receives, from the base station, occupation states and interference amounts for one frame which is from the timeslot 4 of the frame 1 to a timeslot 3 of a frame 2. Then, the mobile station selects a timeslot 5 and starts transmission from the timeslot 5 of the frame 2. As the first example shown in FIG. 5, the method in which a mobile station receives occupation states and interference amounts of timeslots of a length from the time of the transmission request is applicable to a mobile station having low transmission frequency or to a mobile station which does not have exacting delay requirement.

In a second example shown in FIG. 6, the mobile station receives and stores occupation states and interference amounts of timeslots from the base station, and reads the occupation states and interference amounts of timeslots for one frame backward in the time when transmission is requested. For example, in the figure, the mobile station 1 (M1) sends a transmission request at the timeslot 4 of the frame 2 and starts transmission from the timeslot 5 of the frame 2 after selecting the timeslot 5 on the basis of the occupation states and interference amounts of timeslots of one frame which are stored. The second example is applicable to a mobile station having high transmission frequency or a mobile station having exacting delay requirement.

Figure 7:
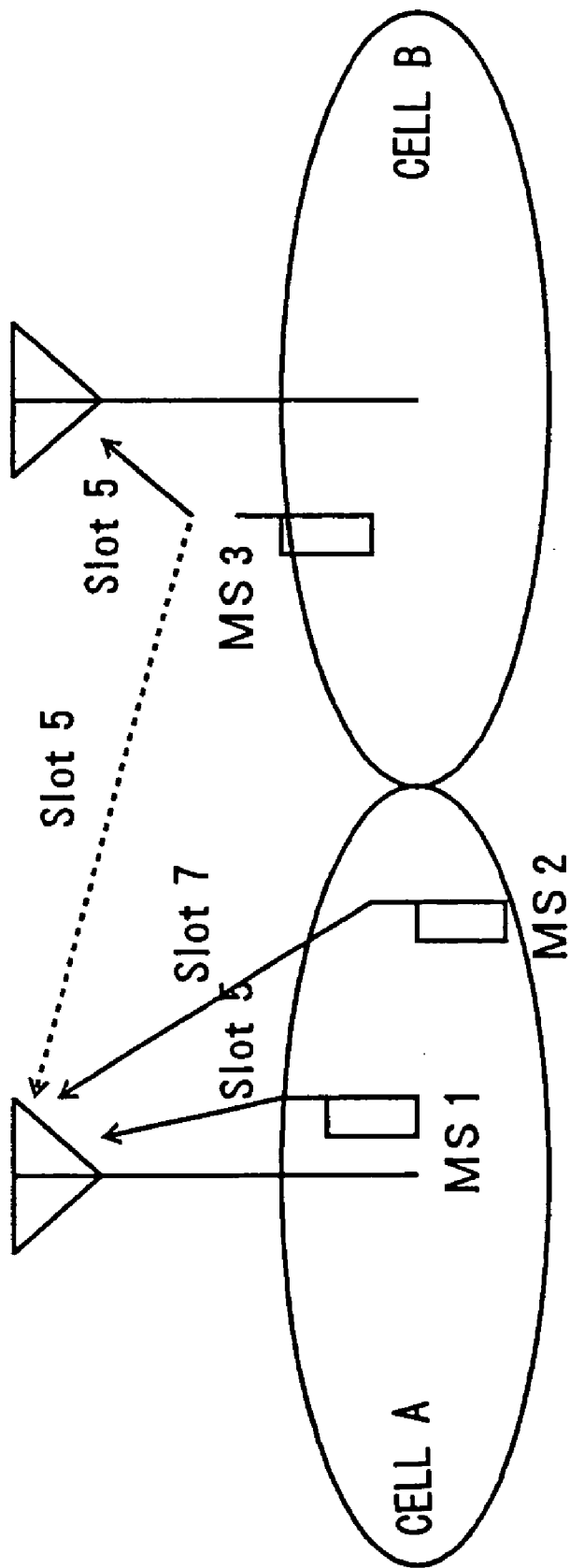
FIG. 7 shows a plurality of mobile stations in a cellular system.
Figure 8A:
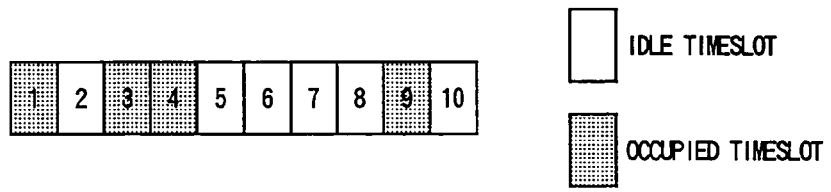
FIGS. 8A and 8B show an example of timeslot occupation state and interference amount in a cell A.
Figure 8B:
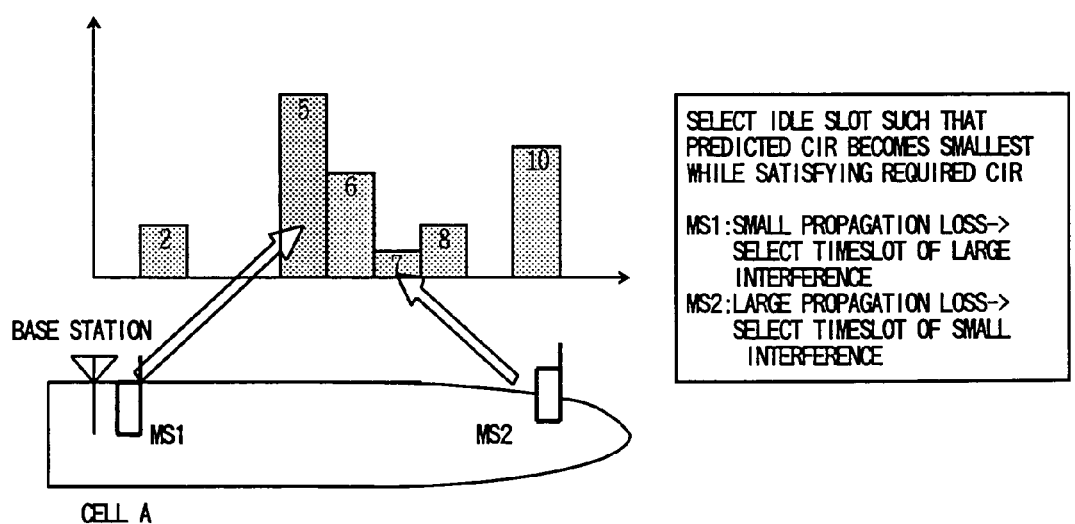

FIG. 7 shows a plurality of mobile stations in a cellular system. FIGS. 8A and 8B show an example of timeslot occupation states and interference amounts in a cell A. In the following, the operation of timeslot selection according to the first embodiment will be described with reference to FIGS. 7, 8A, 8B and 5.

In FIG. 5, when the mobile station 1 (MS1) and the mobile station 2 (MS2) send transmission requests at the time of the timeslot 4 of the frame 1, the mobile station 1 (MS1) receives the occupation states (I/B) and the interference amounts (Itf) of uplink timeslots by downlink timeslots from the timeslot 4 of the frame 1 to the timeslots 3 of the frame 2. Then, the mobile station 1 (MS1) predicts each receive CIR of transmission in the case that each idle timeslot is used. As an example, the occupation states and interference amounts of 10 timeslots for one frame are shown in FIGS. 8A and 8B. Therefore, interference levels of idle timeslots 2, 5, 6, 7, 8 and 10 are shown in FIG. 8B. As shown in FIGS. 7 and 5, since the mobile station 1 (MS1) is close to the base station, the mobile station 1 (MS1) selects a timeslot 5 which has a high interference level. The mobile station 2 (MS2) selects a timeslot 7 which has a low interference level since it is far from the base station.

Each of the mobile stations 1 and 2 performs transmission by using a selected timeslot. When transmission succeeds, remaining information is sent by a timeslot of the same number in the next frame. If transmission fails, transmission is restarted, for example, after a random time. In addition, when transmission by a mobile station succeeds, the base station updates the occupation states and the interference amounts of uplink timeslots and sends them by downlink timeslots.

Figure 9:
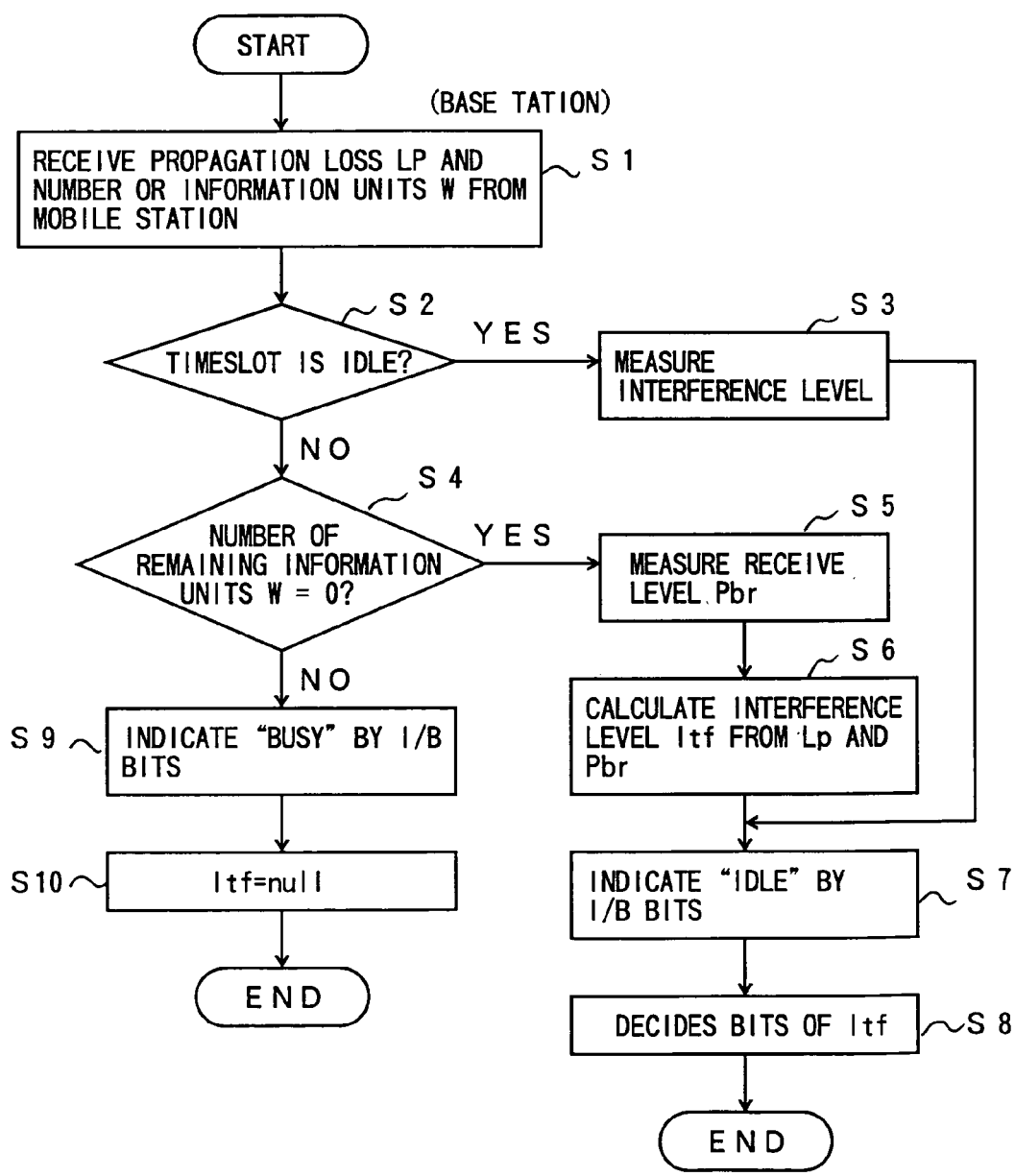
FIG. 9 is a flowchart showing the operation of the base station.

FIG. 9 is a flowchart showing the operation of the base station. The base station receives the propagation loss Lp and a number of information units W from the mobile station in each timeslot in step 1. The base station checks whether each uplink timeslot is idle in step 2. When it is idle, the base station measures the interference level of this timeslot in step 3. When it is not idle, the base station checks whether the timeslot sends the last packet (that is, the number of remaining information units W=0) in step 4. When the timeslot sends the last packet, the base station measures the receive level Pbr in step 5. Then, the interference level Itf is calculated by the above-mentioned formula 3 since the desired wave level C of the mobile station is obtained from the propagation loss Lp in step 6.

After the step 3 and the step 6, the base station notifies the mobile station of the interference amount in a downlink timeslot in which "Idle" is indicated by the I/B bits for the timeslot in steps 7 and 8. When the number of the remaining information units W is larger than 1 in step 4, "Busy" is indicated by the I/B bits for the timeslot in steps 9 and 10.

Figure 10:
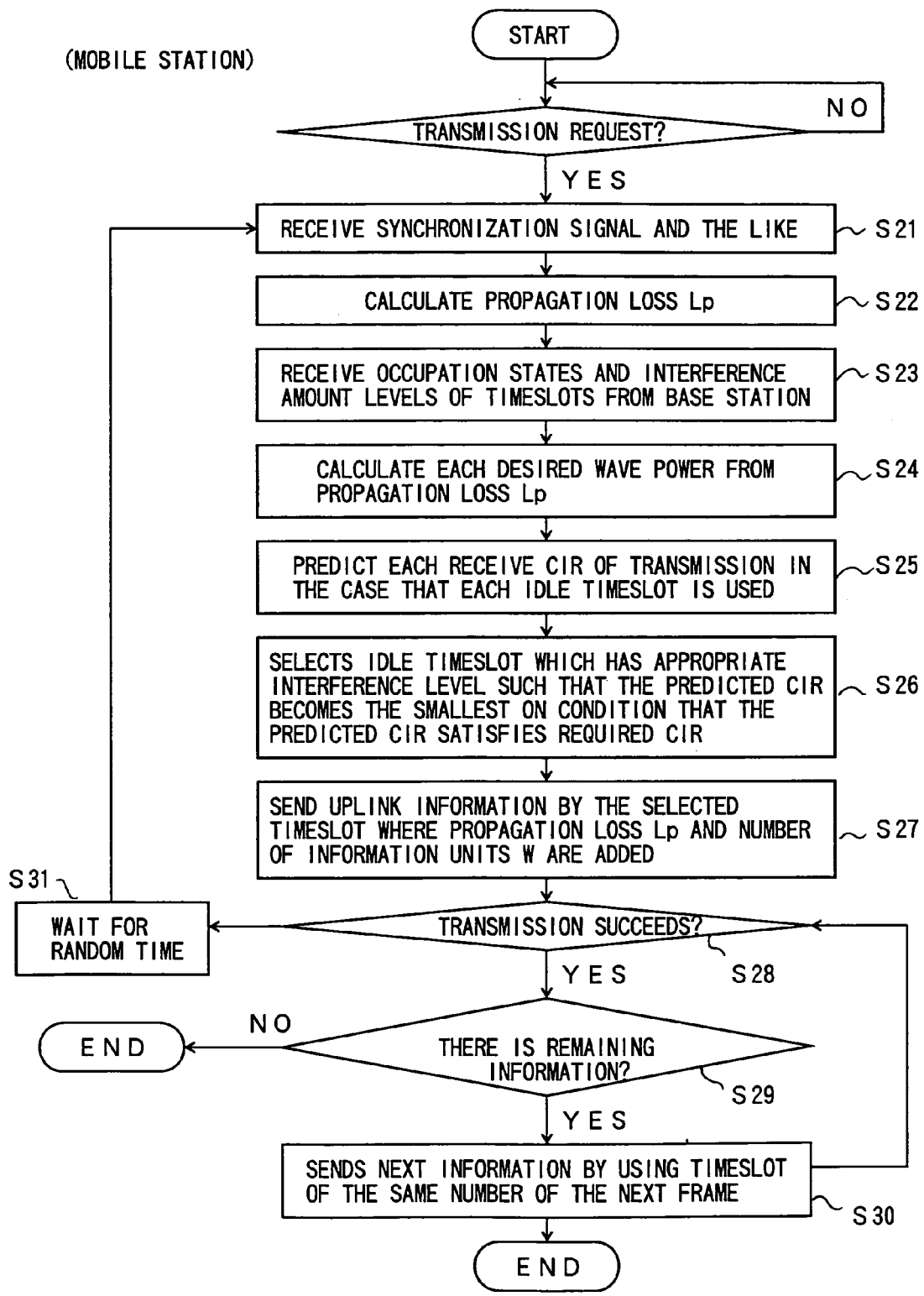
FIG. 10 is a flowchart showing the operation of the mobile station.

FIG. 10 is a flowchart showing the operation of the mobile station. The mobile station which requested transmission calculates the propagation loss Lp by the formula 1 after receiving a synchronizing signal and the like from the base station in step 21 and step 22. Next, the mobile station receives occupation states and interference amount levels of timeslots sent from the base station in step 23. Then, the mobile station calculates each desired wave power from the propagation loss Lp in step 24, and predicts each receive CIR of transmission in the case that each idle timeslot is used in step 25. Next, the mobile station selects an idle timeslot which has an appropriate interference level such that the predicted CIR becomes the smallest on condition that the predicted CIR satisfies a required CIR in step 26. Then, the mobile station sends uplink information by the selected timeslot where the propagation loss Lp and the number of information units W is added in step 27. Next, the mobile station checks whether transmission succeeds in step 28. When transmission succeeds, the mobile station checks whether there is remaining information in step 29, and when there is remaining information, sends next information by using a timeslot of the same number of the next frame in step 30. When transmission fails in step 28, transmission is restarted after a random time in step 31.

Figure 11:
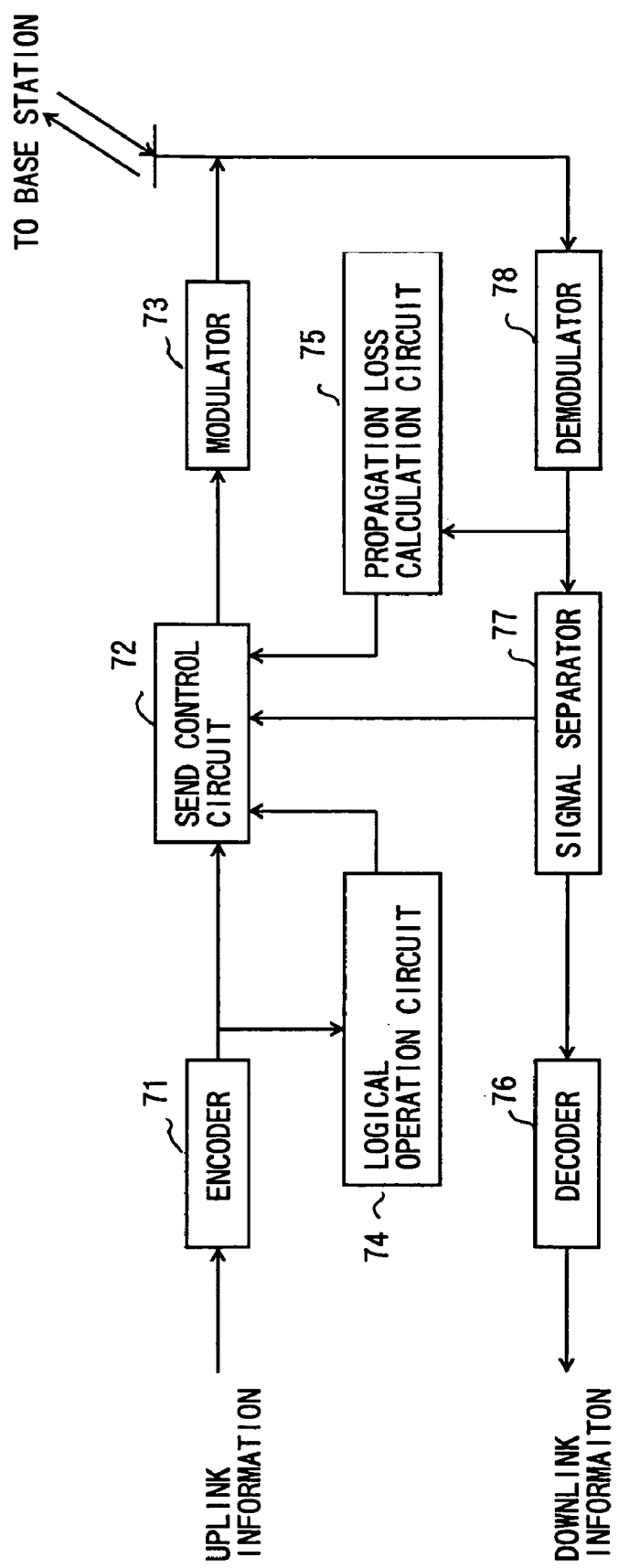
FIG. 11 shows a configuration of a mobile station according to the first embodiment of the present invention.

FIG. 11 shows a configuration of a mobile station according to the first embodiment of the present invention. The mobile station includes an encoder 71, a send control circuit 72, a modulator 73, a logical operation circuit 74, a propagation loss calculation circuit 75, a decoder 76, a signal separator 77 and a demodulator 78.

Figure 12:
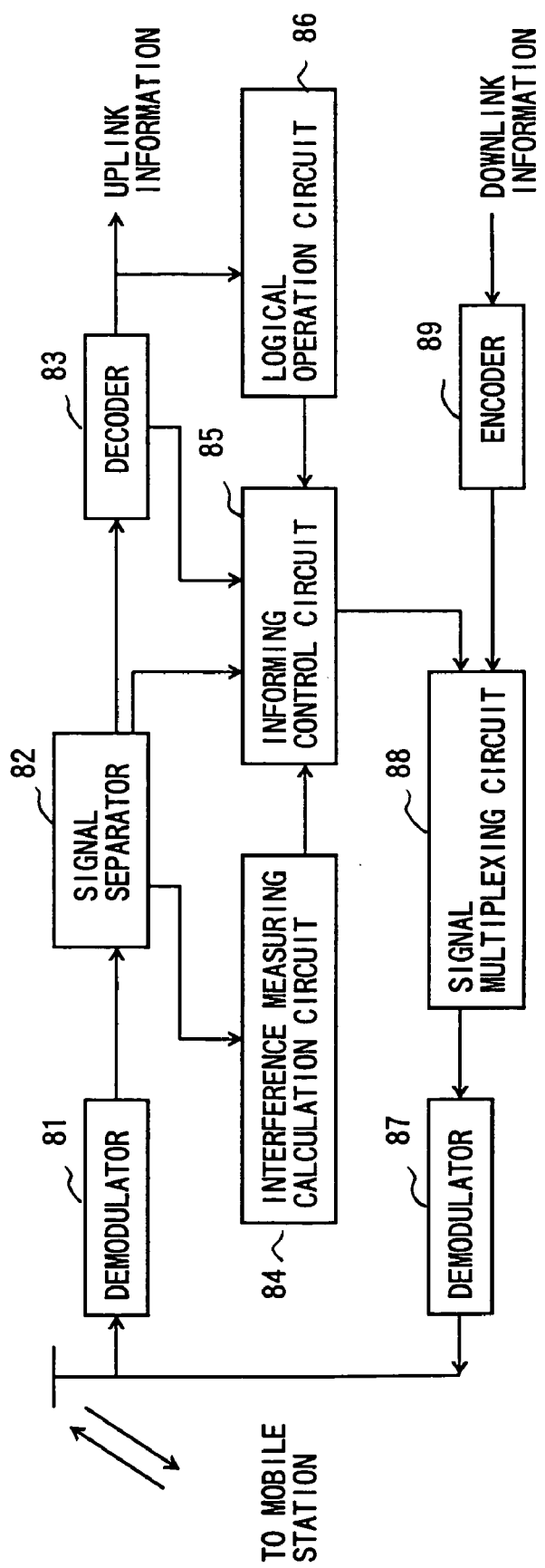
FIG. 12 shows a configuration of a base station according to the first embodiment of the present invention.

FIG. 12 shows a configuration of a base station according to the first embodiment of the present invention. The base station includes a demodulator 81, a signal separator 82, a decoder 83, a interference measuring calculation circuit 84, an informing control circuit 85, a logical operation circuit 86, a demodulator 87, a signal multiplexing circuit 88 and an encoder 89.

In this embodiment, the operation of the mobile station and the base station in the case that an uplink message is sent will be described in the following.

When the mobile station needs to send an uplink message, the encoder 71 shown in FIG. 11 performs error correction encoding on the uplink message for example. Then, the uplink message is input into the send control circuit 72 and waits for being transmitted. The logical operation circuit 74 performs a predetermined process to obtain partial echo data (PE) 17 (shown in FIG. 2) such as extracting a part of a bit sequence of the uplink message, and inputs the partial echo data into the send control circuit 72, and the send control circuit 72 stores the partial echo data.

Downlink data which is demodulated in the demodulator 78 is input into the propagation loss calculation circuit 75 in which the propagation loss is calculated which is input into the send control circuit 72. Then, the signal separation circuit 77 separates the collision control field (E) 13, which is an informing signal part shown in FIG. 2, and input the collision control field (E) 13 into the send control circuit 72. The send control circuit 72 selects a timeslot from timeslots having "I" as the I/B information according to the interference amount level and the propagation loss. Then, transmission is started from a head burst with timing of the selected timeslot.

The base station receives this burst signal. Then, via the demodulator 81 and the signal separator 82, a part of the number of the burst W which is included in the head burst is input into the informing control circuit 85. In addition, a part of the propagation loss Lp is input into the interference measuring calculation circuit 84. The interference measuring calculation circuit 84 measures interference of an idle timeslot and calculates interference of a timeslot which has 0 as the number of the remaining information units by using receiving power and the propagation loss. The interference level Itf 15 which is measured or calculated is input into the informing control circuit 85.

On the other hand, the decoder 83 performs error correction and the like on uplink information in the base station. The decoded uplink information is input into the logical operation circuit 86 and partial echo data 17 which is generated by a process same as that performed in the logical operation circuit 74 is input into the informing control circuit 85.

In addition, error detection is performed in the decoder 83 and notifies the informing control circuit 85 whether the signal is received or not. The informing control circuit 85 sets I/B bits to successive timeslots according to W. The receive/non-receive (R/N) bits 16 are set according to whether the signal is received or not. The notification signal (I/B bits 14, interference level 15, R/N bits 16, partial echo data 17) is sent via the signal multiplexing circuit 88 and the demodulator 87.

In the mobile station, the notification signal is input into the send control circuit 72 via the demodulator 78 and the signal separator 77. In the send control circuit 72, when the R/N information 16 which is input from the signal separator 77 indicates signal receive "R", the partial echo data is compared with data stored in the logical operation circuit 74 before transmission. When they are the same, it is judged that sending data is received correctly, and a next burst is sent.

When the R/N information 17 indicates "non-receive" or when the partial echo data and the stored data are not the same, the mobile station is changed to a waiting state for sending data from the head burst. The mobile station restarts sending after a random time or immediately when the I/B bits indicates I according to the interference amount level and the propagation loss.

Figure 13:
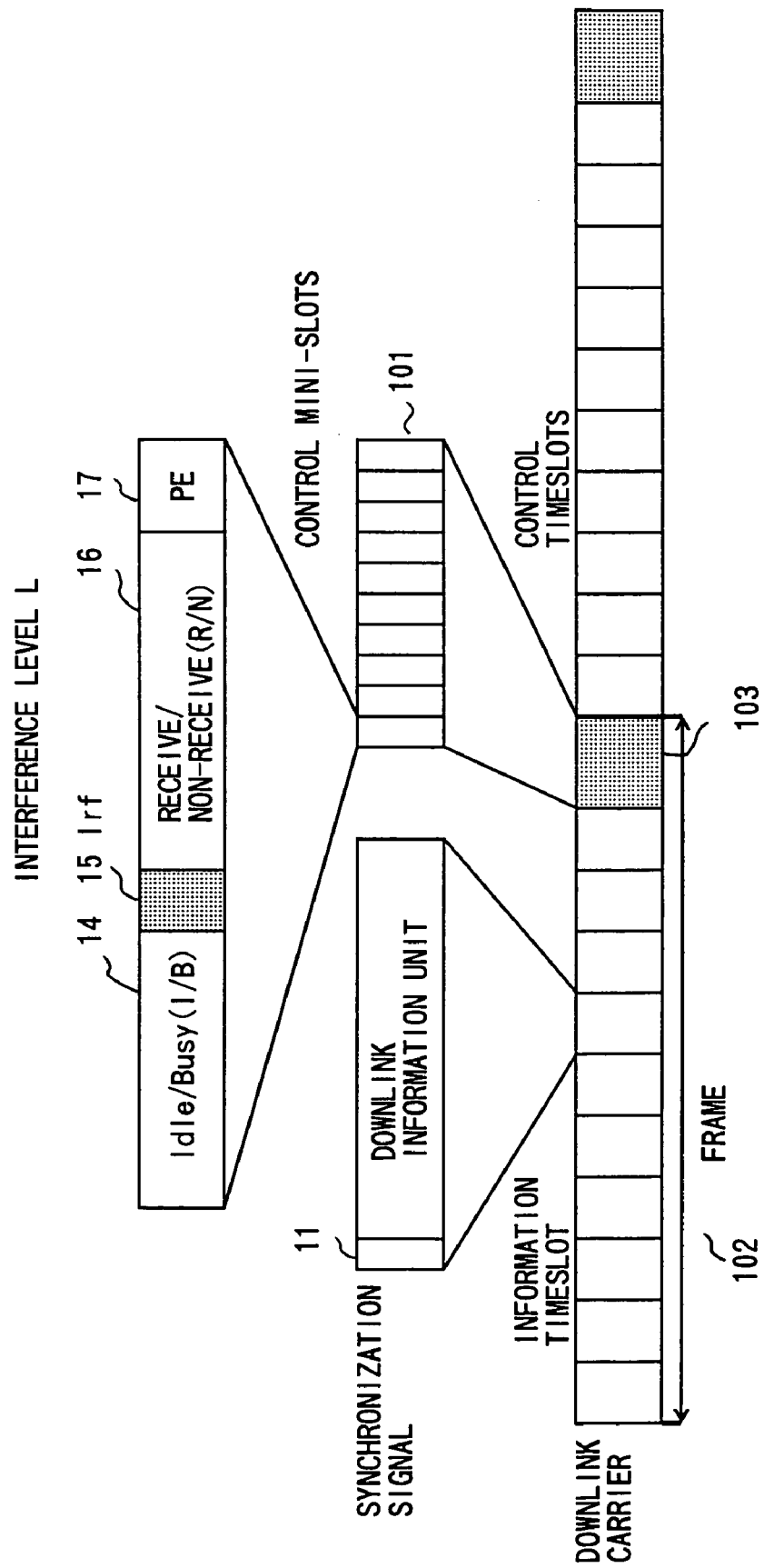
FIG. 13 shows another example of a timeslot configuration.

As shown in FIG. 13, information in the collision control field can be consolidated and located at the tail end of a frame for downlink transmission. In this case, since the mobile station receives the collision control field information only once per a frame, there is a merit that battery life becomes longer. On the other hand, since the mobile station which requests transmission needs to wait until the end of a frame comes, there is a demerit that delay may occur.

As mentioned above, according to the present invention corresponding to the first object, the base station notifies the mobile station of the occupation states and the interference amounts of idle timeslots. Then, the mobile station predicts each receive CIR for transmission in the case that each idle timeslot is used, and selects and sends a timeslot having an appropriate interference such that the predicted CIR is smallest on condition that the predicted CIR satisfies the required CIR. Accordingly, the success rate of transmission is increased for the mobile station. In addition, when a plurality of mobile stations try to send data in a cell simultaneously, they select different timeslots according to propagation loss. Thus, collision rate decreases. Therefore, according to the present invention, a wireless packet transmission method which provides low delay and high throughput can be provided.

In the following, embodiments corresponding to the second object of the present invention will be described with reference to figures. Following embodiments comply with TDMA/TDD. First, outlines of each embodiment will be described. Then, each embodiment will be described in detail.

In a second embodiment, the basic operation of the present invention corresponding to the second object will be described. In a third embodiment, a method in which a timeslot is assigned by a QoS (quality of service) request according to a traffic state at the time of packet transmission acceptance. In this embodiment, giving a higher priority to after-mentioned class 2 users, quality for the class 2 users is degraded in higher priority when congestion occurs.

In a fourth embodiment, a method is described in which the number of timeslots is changed according to a service class and the QoS request when the number of available timeslots decreases or increases during packet transmission. In addition, in the case that timeslots need to be deleted when the number of available timeslots is decreased, the quality for class 2 users is degraded in higher priority In a fifth embodiment, a method in which timeslots are assigned according to a QoS request in consideration of a traffic state at the time of packet transmission acceptance. The difference between the third embodiment and the fifth embodiment is as follows. In the third embodiment, quality for the class 2 users is degraded in higher priority when congestion occurs at the time of acceptance. On the other hand, in the fifth embodiment, excess timeslots which are assigned in excess of a minimum timeslot number or a desired timeslot number are deleted in higher priority.

In a sixth embodiment, a method is described in which the number of timeslots is changed according to a service class and the QoS request when the number of available timeslots decreases or increases during packet transmission. The difference between the fourth embodiment and the sixth embodiment is as follows. In the fourth embodiment, quality of class 2 users is degraded in higher priority when congestion occurs in transmission. On the other hand, in the sixth embodiment, excess timeslots which are assigned beyond a minimum timeslot number or a desired timeslot number are deleted in higher priority when congestion occurs in transmission.

Second Embodiment

In the following, the basic operation of the present invention for TDMA/TDD will be described with reference to figures.

Figure 14A:
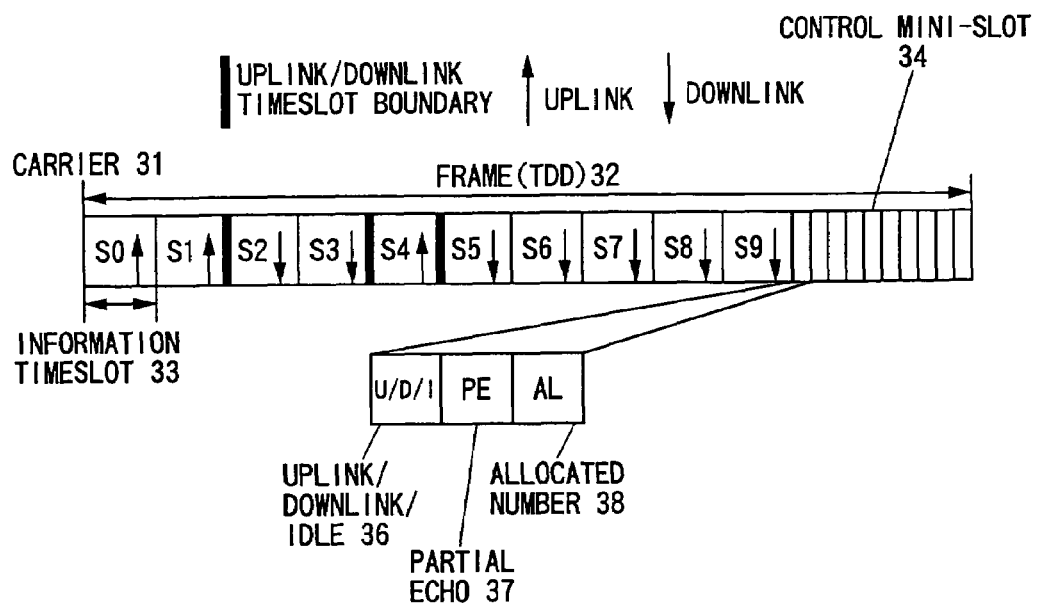
FIG. 14 shows a timeslot configuration according to a second embodiment of the present invention.
Figure 14B:
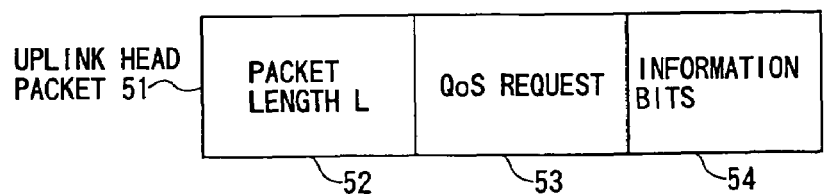

FIGS. 14A and 14B show a timeslot configuration according to the second embodiment of the present invention. As shown in the figure, a carrier 31 includes a frame 32 which repeats with a predetermined interval. The frame includes a plurality of timeslots 33 (information timeslots), control mini-slots 34 each of which slots corresponds to one of the information timeslots 33. The information timeslot is used uplink or downlink.

In this embodiment, uplink or downlink is assigned without constraint. That is, it is permissible that a plurality of boundaries between uplink timeslots and downlink timeslots exist. In the example shown in FIG. 14A, a frame includes ten information timeslots and there are three uplink/downlink boundaries between S1-S2, S3-S4 and S4-S5 respectively.

The control mini-slots 34 are provided at the tail end of each frame. The number of the control mini-slots is the same as the number of the information timeslots, and each control mini-slot corresponds to one of information slots. The control mini-slot includes a timeslot assignment state (uplink/downlink/idle: U/D/I) 36 for a next frame, verification data for verifying that transmission in the current frame succeeds, and allocated timeslot numbers (AL) 38 for assigning timeslots in the next frame for transmitting data continuously. The verification data may be any data as long as the data can be used for the mobile station to verify that information which is sent by the mobile station is successfully received. In this embodiment, partial echo data (PE) 37, which is described in the first embodiment, is used.

As for the allocated timeslot number, the base station decides the number of allocated timeslots according to traffic congestion level, and, then, sends timeslot numbers which are accessed by the mobile station in the next frame. In the example shown in FIG. 14A, the number of timeslots which can be allocated is ten at the maximum.

A head packet 51 for uplink transmission includes a packet length L 52 which is represented by a number of timeslots, a QoS request part 53 and information bits 54. The QoS request part 53 includes the maximum number of timeslots B, a number of desired timeslots E, the minimum number of timeslots W and a service class C.

Next, an example of the timeslot assignment method according to the second embodiment of the present invention will be described with reference to FIG. 15.

Figure 15:
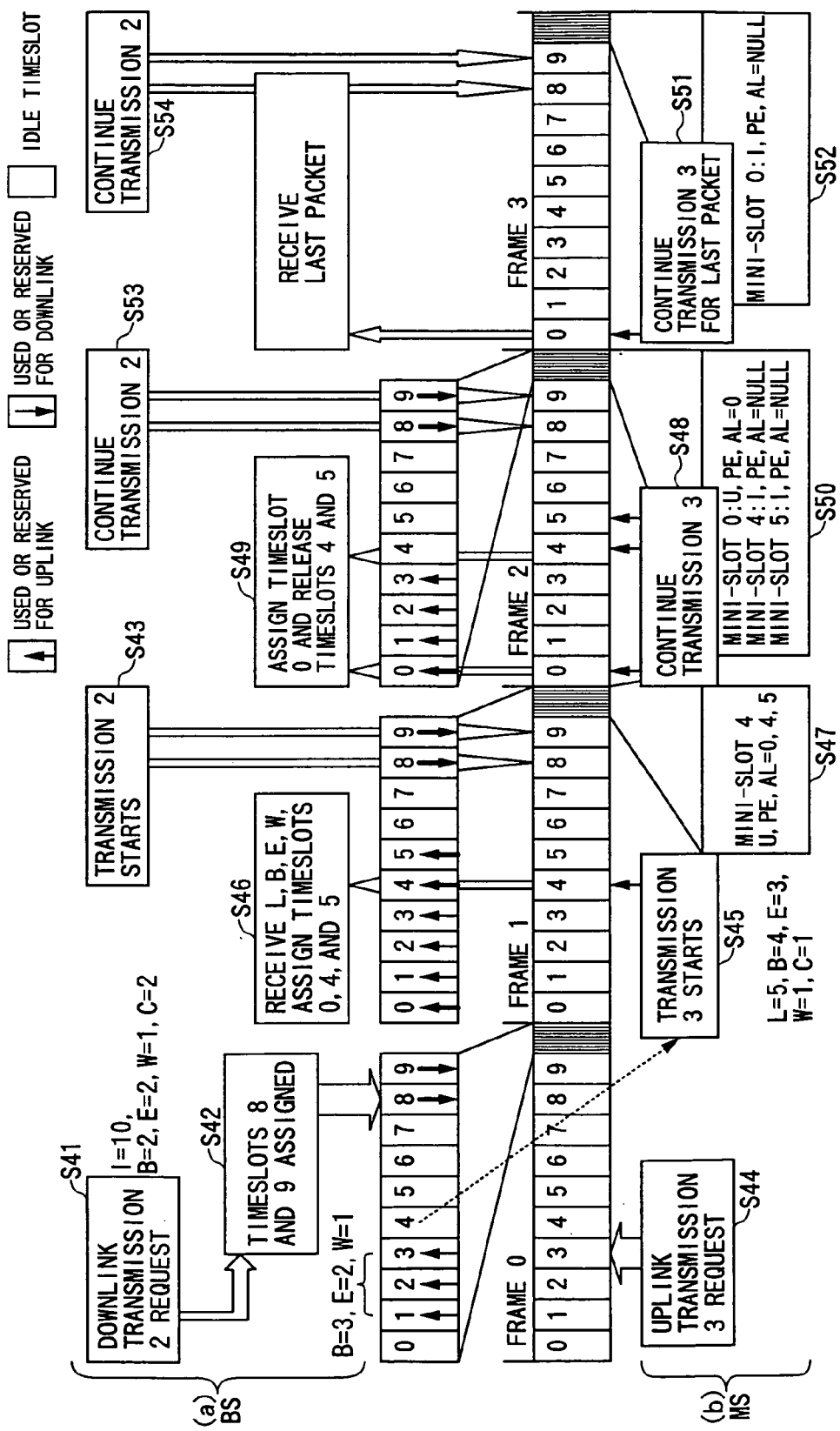
FIG. 15 shows an example of a timeslot assignment method according to the second embodiment of the present.

The part (a) in FIG. 15 shows the operation of the base station (BS), that is, the operation of an after-mentioned timeslot assignment circuit in the base station. The part (b) shows the operation of the mobile station (MS). As shown in FIG. 15, transmission 1 from the mobile station to the base station is already started and timeslots 1, 2 and 3 are used for the transmission 1.

First, transmission from the base station to the mobile station, that is, downlink transmission will be described.

In a frame 0, downlink transmission request 2 having two as the desired number of timeslots arises in the base station in step 41, and the desired number of timeslots (two timeslots) are assigned in step 42. In this example, since timeslots 0, 4, 5, 6, 7, 8 and 9 are idle in the next frame, downlink use reservations are shown in mini-slots corresponding to timeslots 8 and 9. Then, the base station starts transmission from a frame 1 by using the timeslots 8 and 9 in step 43.

Next, transmission from the mobile station to the base station, that is, uplink transmission will be described.

In the frame 0, when an uplink transmission request 3 arises in step 44, the mobile station verifies the timeslot assignment state of the next frame by checking the control mini-slots. As mentioned above, since the timeslots 8 and 9 are already assigned for the downlink transmission request 2, the mobile station selects a timeslot randomly among idle timeslots 0, 4, 5, 6 and 7.

In the example shown in FIG. 15, the mobile station starts transmission corresponding to the uplink transmission request 3 by using a timeslot 4 in step 45, and sends the packet length L=5 and the QoS request (the maximum timeslot number B=4, the desired timeslot number E=3, the minimum timeslot number W=1 and the service class C=1) by adding the length and the QoS request to the head of information bits. Usage of the maximum number of timeslots B, the desired number of timeslots E, the minimum number of timeslots W and the service class C will be described later. Since the desired number of timeslots is three for the transmission request 3, the base station assigns timeslots 0, 4 and 5 (step 46) and sends the assigned timeslot numbers to the mobile station by using the control mini-slot (AL=0, 4, 5 in the mini-slot 4).

Then, the mobile station verifies that data which is sent from the mobile station at the timeslot 4 in the frame 1 is received by the base station and timeslots 0, 4 and 5 are assigned for the next frame in step 47. The mobile station sends data from the frame 2 according to instructions of the control mini-slot in step 48/In addition, the mobile station verifies that data which is sent be the mobile station is received or not by receiving partial echo data in the control-mini slots 0, 4, 5 in the frame 2 and by comparing them with corresponding data stored in the mobile station.

Since the packet length of the uplink transmission request 3 is five, remaining data length becomes one after the mobile station sends data by using timeslots 0, 4 and 5 of the frame 2. The base station assigns a timeslot 0 in the control mini-slot right after the frame 2 for transmission of the frame 3 and releases timeslots 4 and 5 in step 49. That is, when the base station recognizes that the last information timeslot is received, the base station changes the timeslot assignment state and the allocated number for the timeslot of the next frame to "I" (idle) and "null" respectively, and notifies the mobile station of them by the control mini-slot.

Then, the mobile station recognizes that data which is sent from the mobile station is received and the last one packet is assigned to the timeslot 0 in the next frame (frame 3) on the basis of the control mini-slot in the frame 2 in step 50. When the mobile station sends the last packet by the timeslot 0 in the frame 3 to the base station in step 51, the base station does not perform timeslot assignment for the transmission request 3. Then, the mobile station checks the control mini-slot 0 of the frame 3 so as to recognize that data sent by the mobile station is received and timeslot assignment is completed since data transmission is completed in step 52. On the other hand, the length of the downlink transmission 2 is ten, the downlink transmission 2 continues at the time of the frame 3 (Steps 53, 54).

Figure 16:
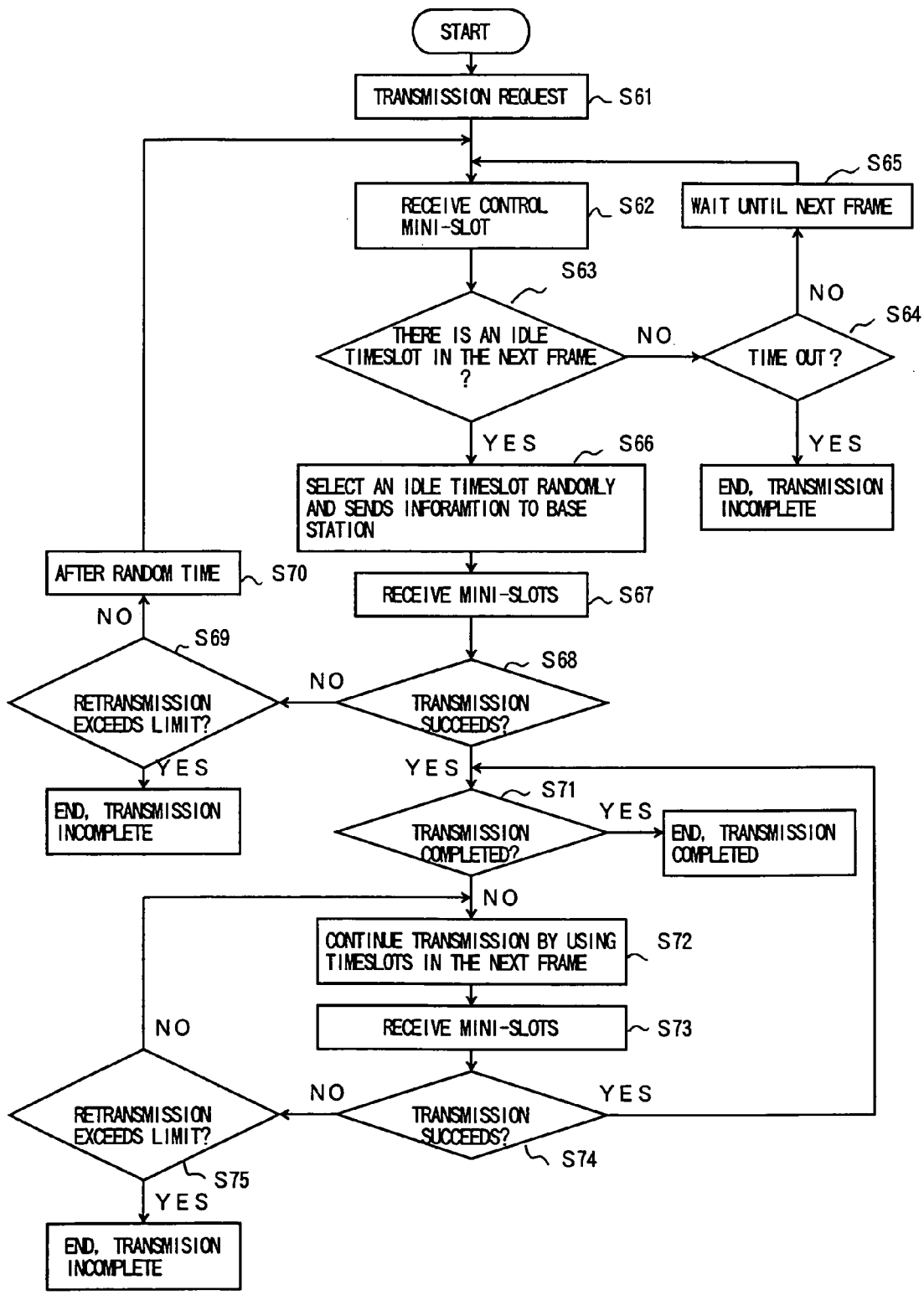
FIG. 16 is a flowchart showing an operation of the mobile station according to embodiments of the present invention.

FIG. 16 is a flowchart showing the operation of the mobile station. When a transmission request arises in the mobile station in step 61, the mobile station receives the control-mini slots in the tail end of a frame in step 62 and checks whether there is an idle timeslot in the next frame in step 63. When there is not any idle timeslot in the next frame, the mobile station checks whether the mobile station is in time-out or not in step 64. When it is in time-out, the process ends as the transmission is incomplete. When it is not in time-out, the mobile station waits until it receives the control mini-slots in the next frame in step 65.

When there is at least an idle timeslot in the next frame in step 63, the mobile station selects an idle timeslot randomly and sends information where information bits which represent the packet length L, the maximum number of timeslots B, the desired number of timeslots E, the minimum number of timeslots W and the service class C are added at the head to the mobile station in step 66. Next, the mobile station receives a control mini-slot sent from the base station which corresponds to the idle timeslot sent from the mobile station in step 67, and the mobile station checks whether transmission succeeds or not in step 68. When transmission fails, the mobile station retransmits the information in steps 69 and 70, wherein, when the number of retransmissions exceeds a limit, the process ends as the transmission is incomplete.

When the transmission succeeds in step 68, the mobile station checks whether packet transmission is completed in step 71. When it is completed, the process ends. When it is not completed, the mobile station continues transmission by using information timeslots in the next frame which are assigned in step 72.

Figure 17:
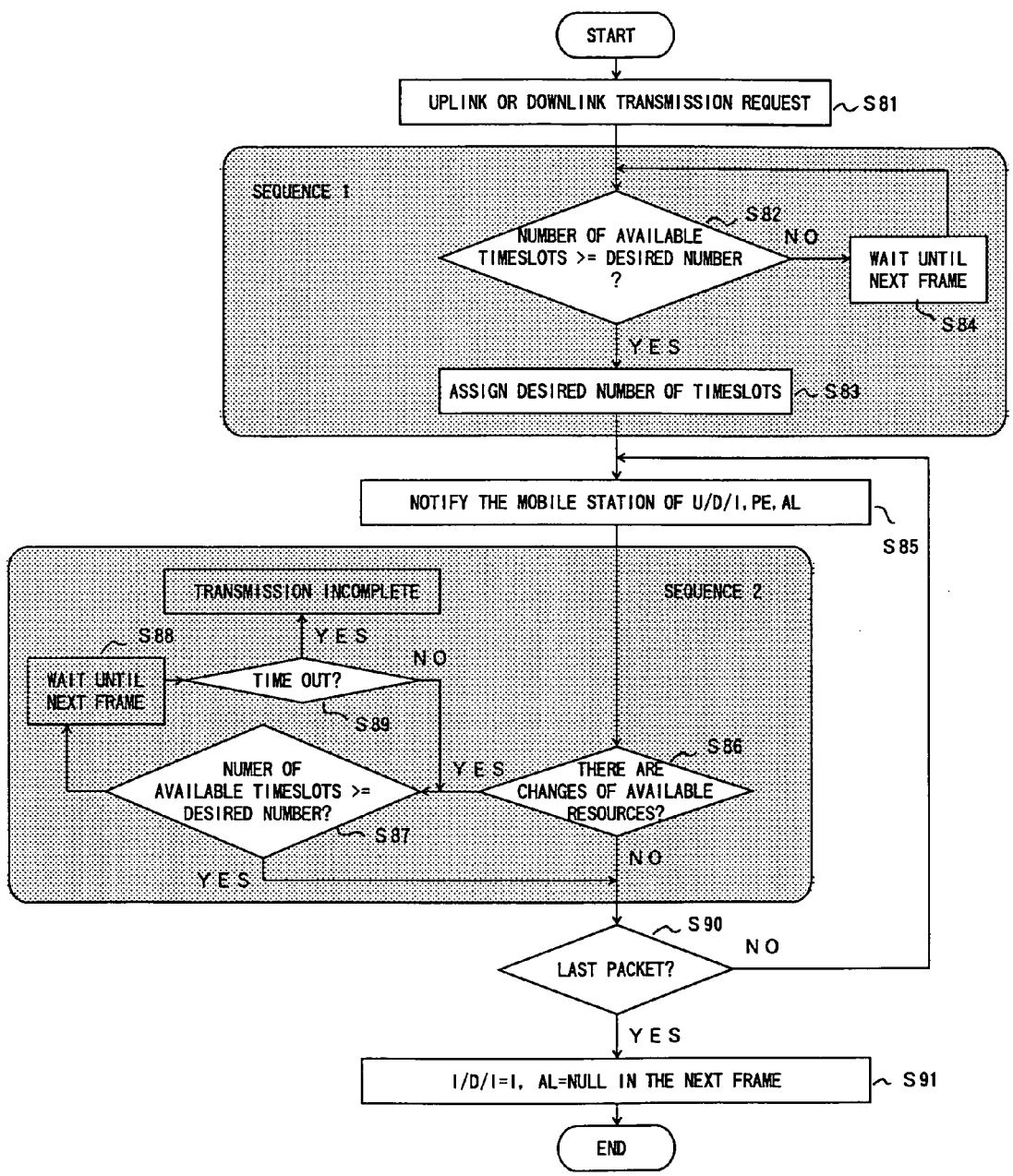
FIG. 17 is a flowchart showing the operation of the base station according to the second embodiment of the present invention.

FIG. 17 is a flowchart showing the operation of the base station according to the second embodiment of the present invention. When the base station receives an uplink head packet from the mobile station or when a downlink transmission request arises in the base station in step 81, the base station assigns timeslots of the desired number if there are available timeslots more than the desired number of timeslots in steps 82 and 83. If the number of the available timeslots is smaller than the desired number, the base station waits for the next frame in step 84.

When at least an timeslot is assigned, the base station notifies the mobile station of the timeslot assignment state U/D/I, receive verification data PE, the allocated timeslot numbers AL of the next frame by using the control mini-slots in step 85. In the case that there are changes of available resources during transmission, if the number of available timeslots is equal to or larger than the desired number of timeslots (when YES in steps 86 and 87), the base station maintains the current state. If the number of available timeslots is equal to or smaller than the desired timeslot number (when NO in step 87), the base station waits until the number of available timeslots increases to the desired number of timeslots in steps 88 and 89. When the base station receives the last uplink packet (when YES in step 90), the base station sends the timeslot assignment state of the next frame as "I" (idle), the receive verification data PE and the allocated timeslot number AL=null to the mobile station by using the control mini-slot in step 91.

In the above-mentioned process, the part of steps 82-84 is called a sequence 1 and the part of the steps 86-89 is called a sequence 2.

Figure 18:
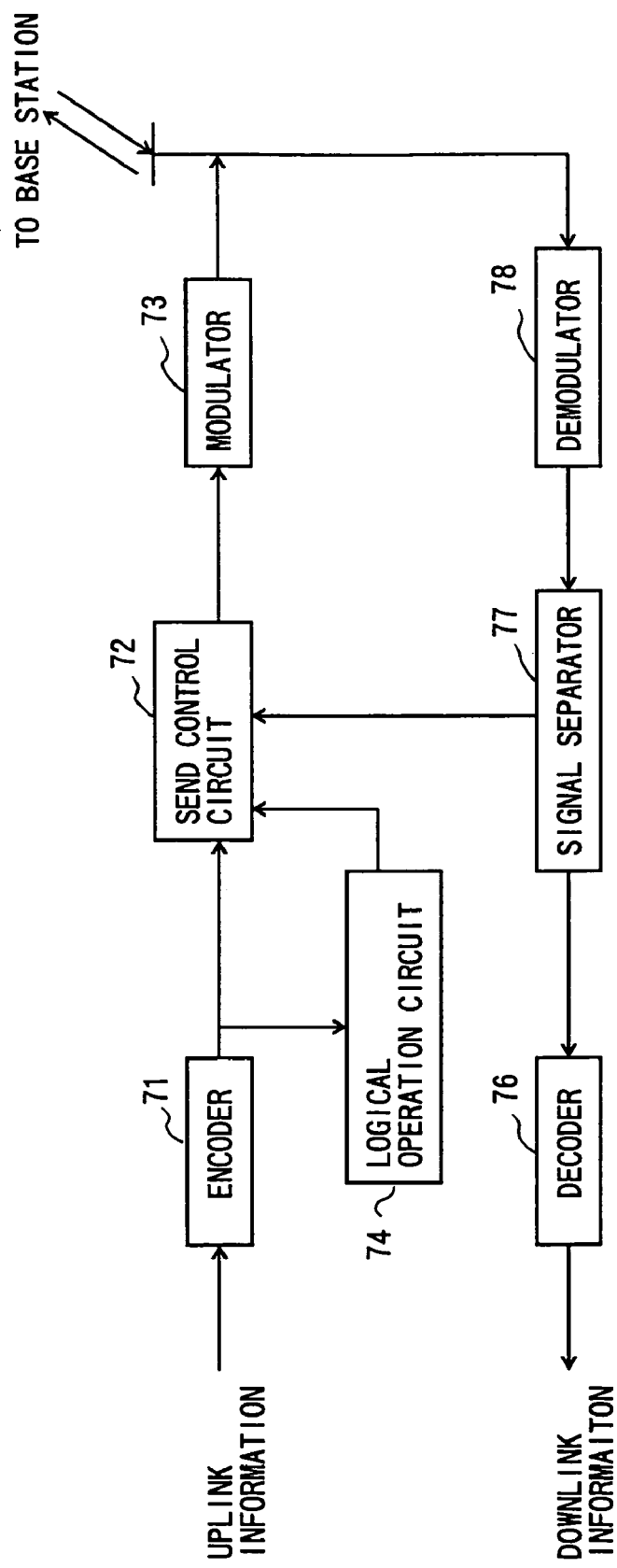
FIG. 18 shows a configuration of a mobile station according to embodiments of the present invention.

FIG. 18 shows a configuration of the mobile station according to the embodiment of the present invention. The mobile station includes an encoder 71, a send control circuit 72, a modulator 73, a logical operation circuit 74, a decoder 76, a signal separator 77 and a demodulator 78.

Figure 19:
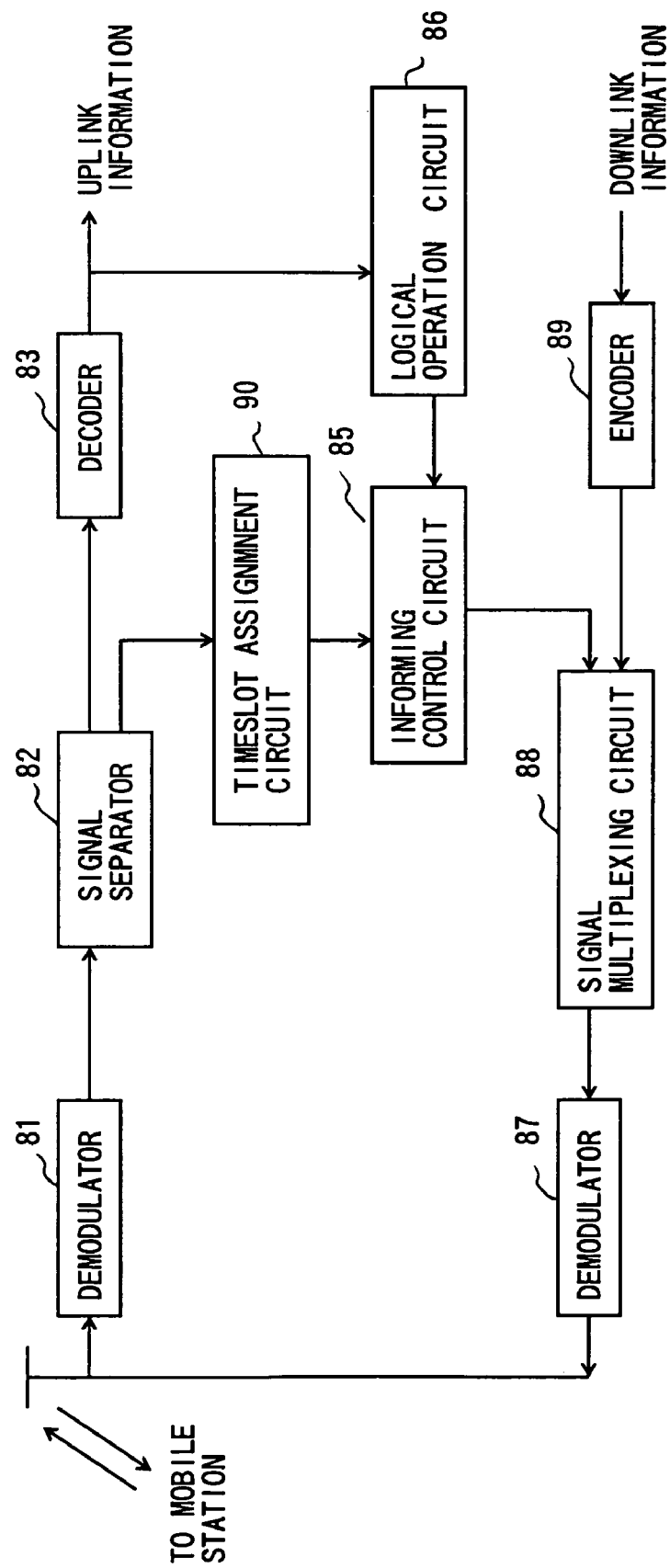
FIG. 19 shows a configuration of a base station according to embodiments of the present invention.

FIG. 19 shows a configuration of a base station according to the embodiment of the present invention. The base station includes a demodulator 81, a signal separator 82, a decoder 83, an informing control circuit 85, a logical operation circuit 86, a demodulator 87, a signal multiplexing circuit 88 and an encoder 89, a timeslot assignment circuit 90.

The operation of the mobile station and the base station will be described according to the embodiment.

When the mobile station needs to send an uplink message, a process such as an error correction process is performed on the message in the encoder 71 and the message is input into the send control circuit 72 for transmission. The logical operation circuit 74 generates partial echo data (PE in FIG. 14) by extracting a part of a bit sequence of the uplink information, inputs the partial echo data into the send control circuit 72 which stores the partial data.

The demodulator 78 demodulates data from the base station. The signal separator 77 separates the control mini-slots from the data and inputs the control mini-slots into the send control circuit 72. Then, the mobile station selects timeslots having "I" as the U/D/I information from the left side, and starts transmission of a head burst at the timing of the selected timeslots.

When the base station receives the burst, the number of packets (packet length L in FIG. 14) for the message and the QoS request (QoS request part in FIG. 14) which are included in the head burst are input into the timeslot assignment circuit 90 via the demodulator 81 and the signal separator 82 as shown in FIG. 19. According to the result of timeslot assignment by the timeslot assignment circuit 90, the timeslot assignment state U/D/I (U/D/I 36 in FIG. 14) and the allocated timeslot numbers (AL 38 in FIG. 14) are input into the informing control circuit 85. On the other hand, the error correction process, for example, is performed on uplink information from the mobile station in the decoder 83. As a result, decoded uplink information is input into the logical operation circuit 86. In addition, partial echo data generated by performing the same process as performed in the logical operation circuit 74 of the mobile station is input into the informing control circuit 85.

The informing control circuit 85 sets the state U/D/I, the partial echo and the allocated timeslot number for each information timeslot as informing data. The informing data is sent to the mobile station via the signal multiplexing circuit 88 and the demodulator 87.

In the mobile station, the informing data is input into the send control circuit 72 via the demodulator 78 and the signal separator 77. The send control circuit 72 compares the partial echo input from the signal separator 77 with partial echo stored in the logical operation circuit 74. When they are the same, the mobile station judges that sent data is received correctly. Then, the mobile station accesses assigned timeslots so as to continue transmission according to the assigned timeslot numbers AL in the next frame.

When both of the partial echo data are not the same, the mobile station waits for transmitting the head burst again, and, then, the mobile station restarts transmission immediately or after a random time when U/D/I becomes I.

Third Embodiment

In the third embodiment, packet transmission is prioritized and timeslots are assigned by using the QoS request according to traffic state at the time of packet transmission acceptance.

In this embodiment, the prioritization includes two stages which are a service class 1 and a service class 2. However, it is possible to provide more service classes such that timeslots are allocated more flexibly according to multi-QoS.

In this embodiment, channel (timeslot) assignment is performed so that desired quality is assured maximally for a user of the service class 1 (high class). For a user of the service class 2 (low class), channel (timeslot) assignment is performed on best-effort basis.

In addition, quality is degraded for the class 2 user in higher priority when traffic is congested at the time of packet transmission acceptance.

That is, as mentioned later, when available timeslots are insufficient for a class 1 user, timeslots are assigned for the class 1 user by deleting one or more timeslots of other users, wherein timeslots are deleted in the following order, which is, timeslots which are assigned in excess of the minimum number of timeslots of the service class 2, minimum timeslots of the class 2, timeslots which are assigned in excess of the desired number of timeslots of the class 1. The timeslots deleted in this order are assigned to a new user.

The timeslot configuration of the third embodiment is the same as that of the second embodiment which is shown in FIG. 14. The operation flowchart of the mobile station of the third embodiment is the same as that of the second embodiment which is shown in FIG. 16.

Figure 20:
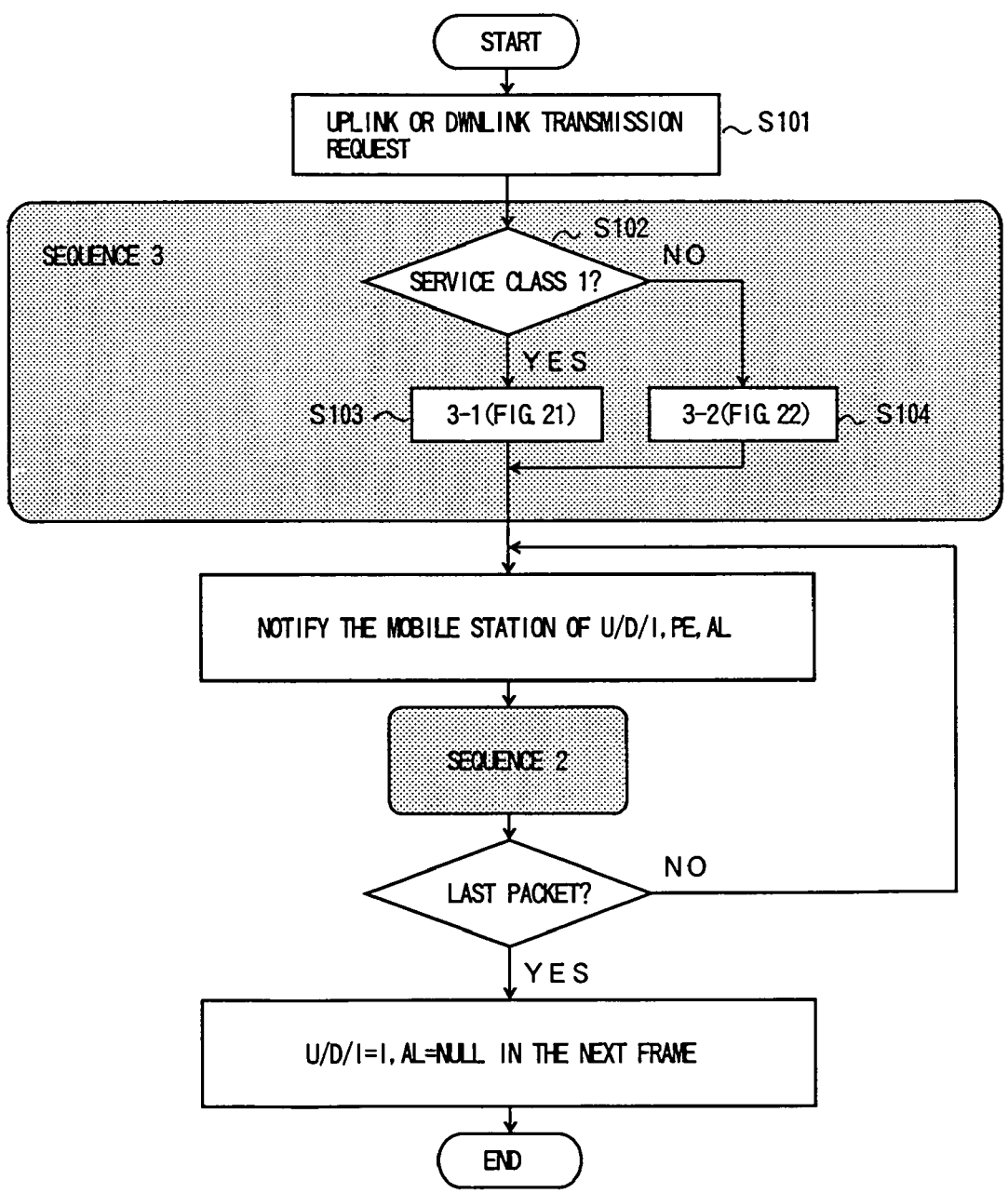
FIG. 20 is a flowchart showing the operation of the base station according to a third embodiment.

FIG. 20 is a flowchart showing the operation of the base station of the third embodiment.

Figure 21:
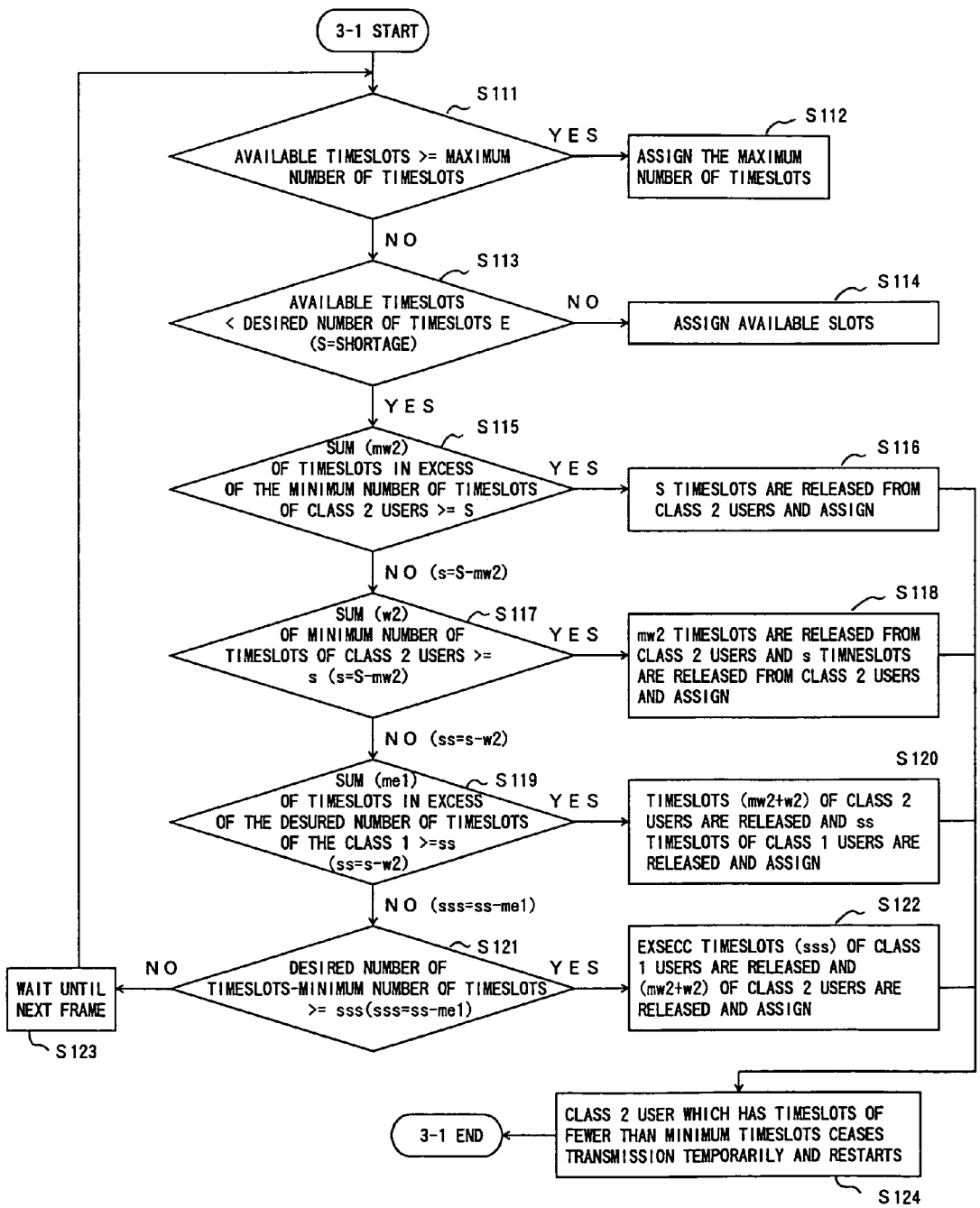
FIG. 21 is a flowchart showing a channel assignment method for a class 1 user according to the third embodiment.
Figure 22:
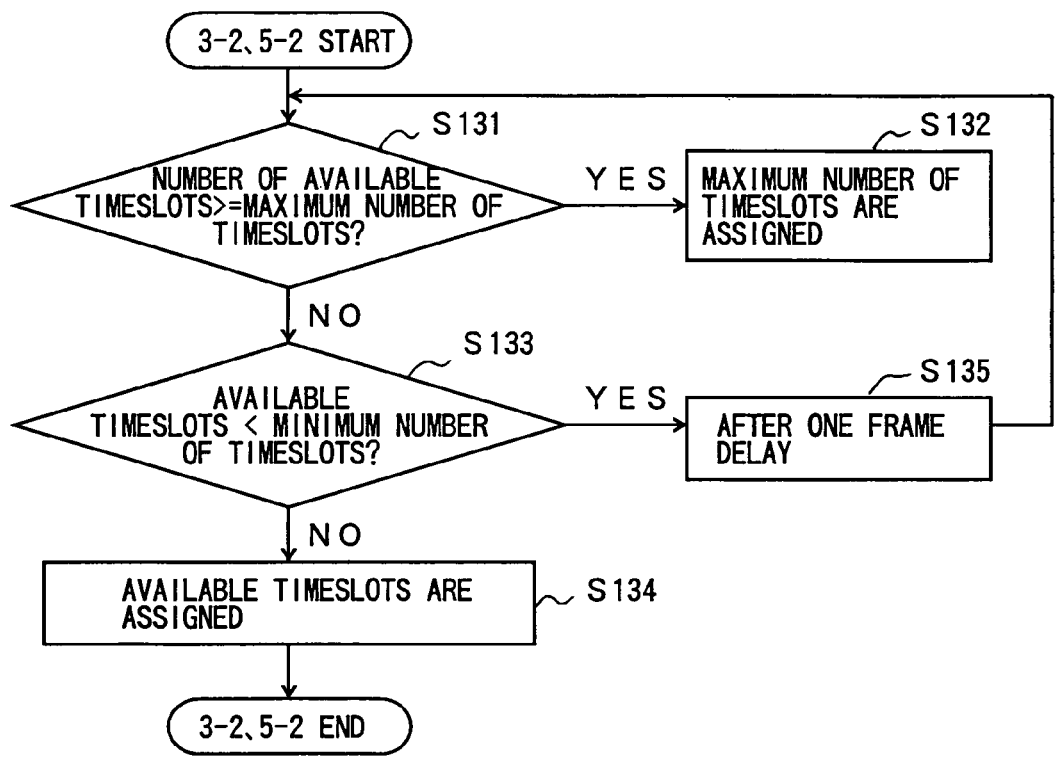
FIG. 22 is a flowchart showing a channel assignment method for a class 2 user according to embodiments of the present invention.

When the base station receives an uplink head packet or there is a downlink transmission request in step 101, the base station checks the service class in step 102. When the service class is 1, a process (3-1) shown in FIG. 21 is performed in step 103. When the service class is not 1, a process (3-2) shown in FIG. 22 is performed in step 104. The process after the step 103 or the step 104 is the same as that of the flowchart shown in FIG. 17 from step 85.

Next, the method of timeslot assignment to a class 1 user will be described in the following with reference to FIG. 21. When the number of available timeslots is larger than the maximum number of timeslots (when YES in step 111), timeslots of the maximum number are allocated for the user in step 112.

When the number of available timeslots is smaller than the maximum number but larger than the desired number E of timeslots (when NO in step 113), the available timeslots are allocated for the user in step 114.

On the other hand, in the case of the number of available timeslots is smaller than the desired number of timeslots (when YES in step 113), when the sum mw2 of timeslots which are assigned for the class 2 users in excess of the minimum number of timeslots for each class 2 user is larger than the number of a shortage S of timeslots in step 115, S timeslots are released from class 2 users in decreasing order of the number of excess timeslots, and the released timeslots and the available timeslots are assigned to the class 1 user in step 116.

When No in step 115, all or a part of timeslots of one or more class 2 users are released for assigning the timeslots to the class 1 user in steps 117 and 118. That is, if the sum (w2) of the minimum number of timeslots of the class 2 users is equal to or larger than a shortage s (s=S−mw2) in step 117, mw2 timeslots are released from the class 2 users and s timeslots are released from class 2 users in decreasing order of the minimum number of timeslots, and the released timeslots and the available timeslots are assigned to the class 1 user in step 118

When timeslots for the class 1 user can not be assigned fully even when timeslots of the class 2 users are released (when NO in step 117), one or more timeslots which are already assigned for each class 1 user in excess of each desired number of timeslots are released for the new class 1 user in steps 119 and 120. That is, if sum (me1) of timeslots in excess of the desired number of timeslots of the class 1 users is equal to or larger than a shortage ss (ss=s−w2) in step 119, the timeslots (mw2+w2) of the class 2 users are released and ss timeslots of the class 1 users are released in decreasing order of the number of excess timeslots in step 120. Then, the released timeslots and the available timeslots are assigned to a new user. In step 120, when there are a plurality of class 1 users of the same condition, one or more of the target class 1 user where a part of timeslots is released are selected randomly.

When timeslots are not fully assigned for the new class 1 user even after the above-mentioned processes (when NO in step 119), timeslots which are in excess of the minimum number of timeslots for the class 1 users are used in steps 121 and 122. That is, if (the desired number of timeslots—the minimum number of timeslots) is equal to or larger than a shortage sss (sss=ss−me1) in step 121, the excess timeslots (sss) of the class 1 users are released and (mw2+w2) of the class 2 users are released in step 122. The released timeslots and the available timeslots are used for a new user.

When timeslots are not fully assigned for the new class 1 user even after the above-mentioned processes, the base station wait until the next frame comes in step 123.

In the above-mentioned processes, a class 2 user which has timeslots of fewer than the minimum timeslots ceases transmission temporarily, and restarts transmission as soon as necessary timeslots become available in step 124.

Next, a channel assignment method for a class 2 user will be described with reference to a flowchart shown in FIG. 22. This flowchart corresponds to the step 104 in FIG. 20.

When transmission request of class 2 is received, the base station checks the number of available timeslots in step 131. When the number of available timeslots is equal to or larger than the maximum number of timeslots (when YES in step 131), the maximum number of timeslots are assigned in step 132. When the number of available timeslots is smaller than the maximum number of timeslots (NO in step 131) but larger than the minimum number of timeslots (NO in step 133), the available timeslots are assigned for the class 2 user in step 134. When the number of available timeslots is smaller than the number of minimum timeslots (YES in step 133), the base station tries timeslot assignment after one frame in step 135.

Each of the configuration of the mobile station and the base station is the same as those of the second embodiment which are shown in FIG. 18 and FIG. 19 respectively.

Fourth Embodiment

In this embodiment, a method will be described in which the number of timeslots is changed according to the service class and the QoS request when the available timeslots decrease or increase during packet transmission. In addition, when the available timeslots decrease, timeslots are deleted such that quality of class 2 users is degraded in higher priority. That is, as mentioned later, when one or more timeslots are deleted, timeslots are deleted in order of timeslots which are assigned in excess of minimum timeslots of the class 2 users, minimum timeslots of the class 2 users, timeslots which are assigned in excess of desired timeslots of the class 1 users for assigning to a new user.

The timeslot configuration of the fourth embodiment is the same as that of the second embodiment which is shown in FIG. 14.

Figure 23:
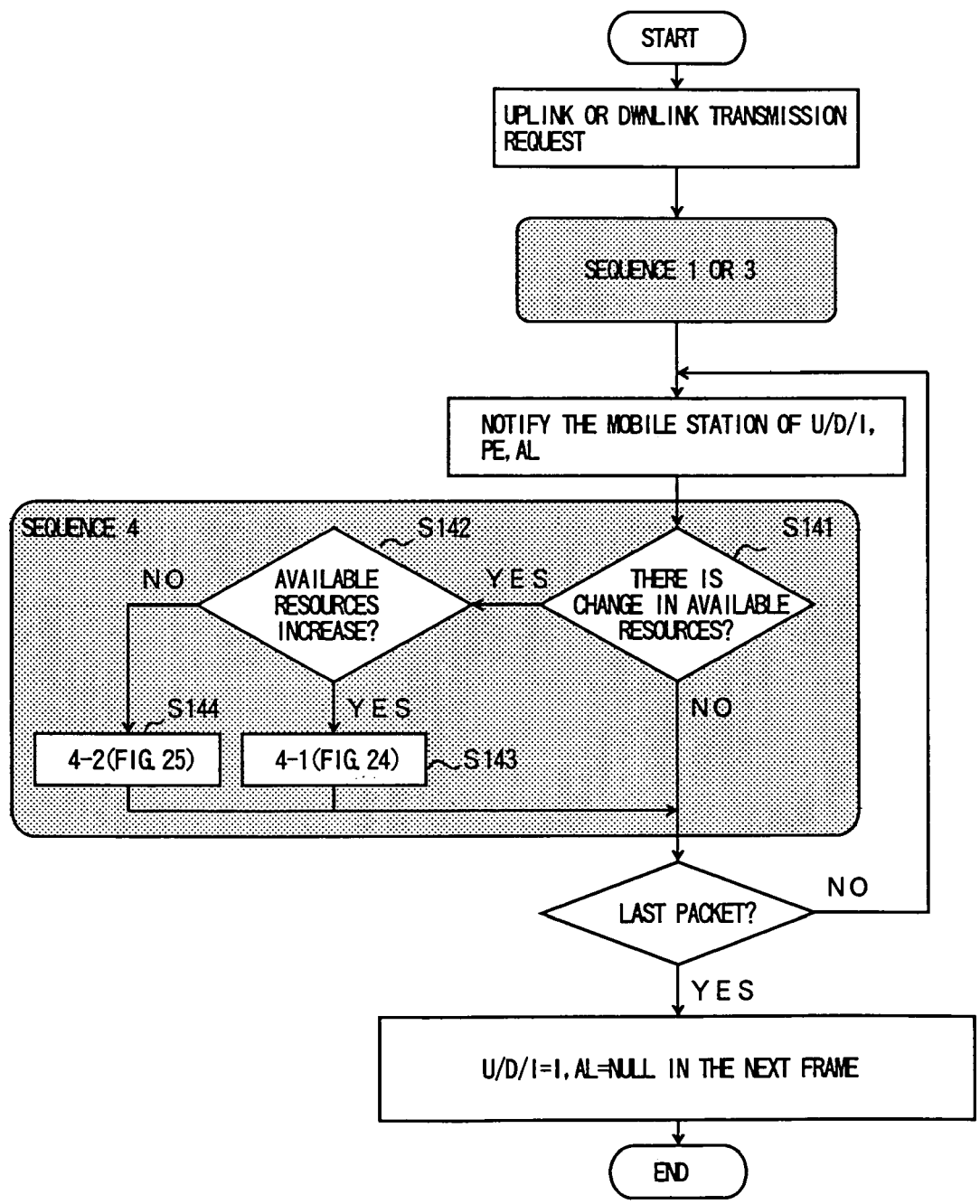
FIG. 23 is a flowchart showing the operation of the base station according to a fourth embodiment.

FIG. 23 is a flowchart showing the operation of the base station according to the fourth embodiment. A process (sequence 4) in the case that available resources are changed during transmission will be described.

Figure 24:
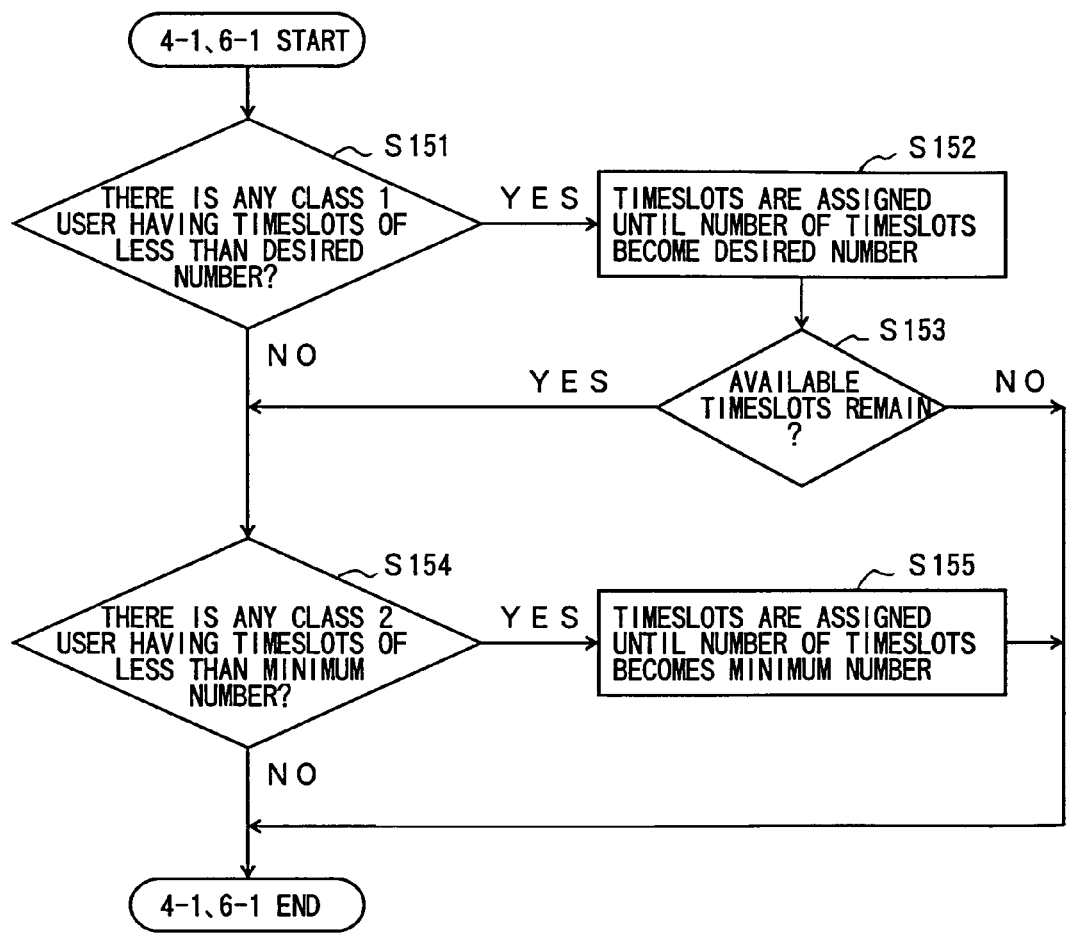
FIG. 24 is a flowchart showing timeslot assignment for a class 1 user when available resources increase during data transmission according to embodiments of the present invention.
Figure 25:
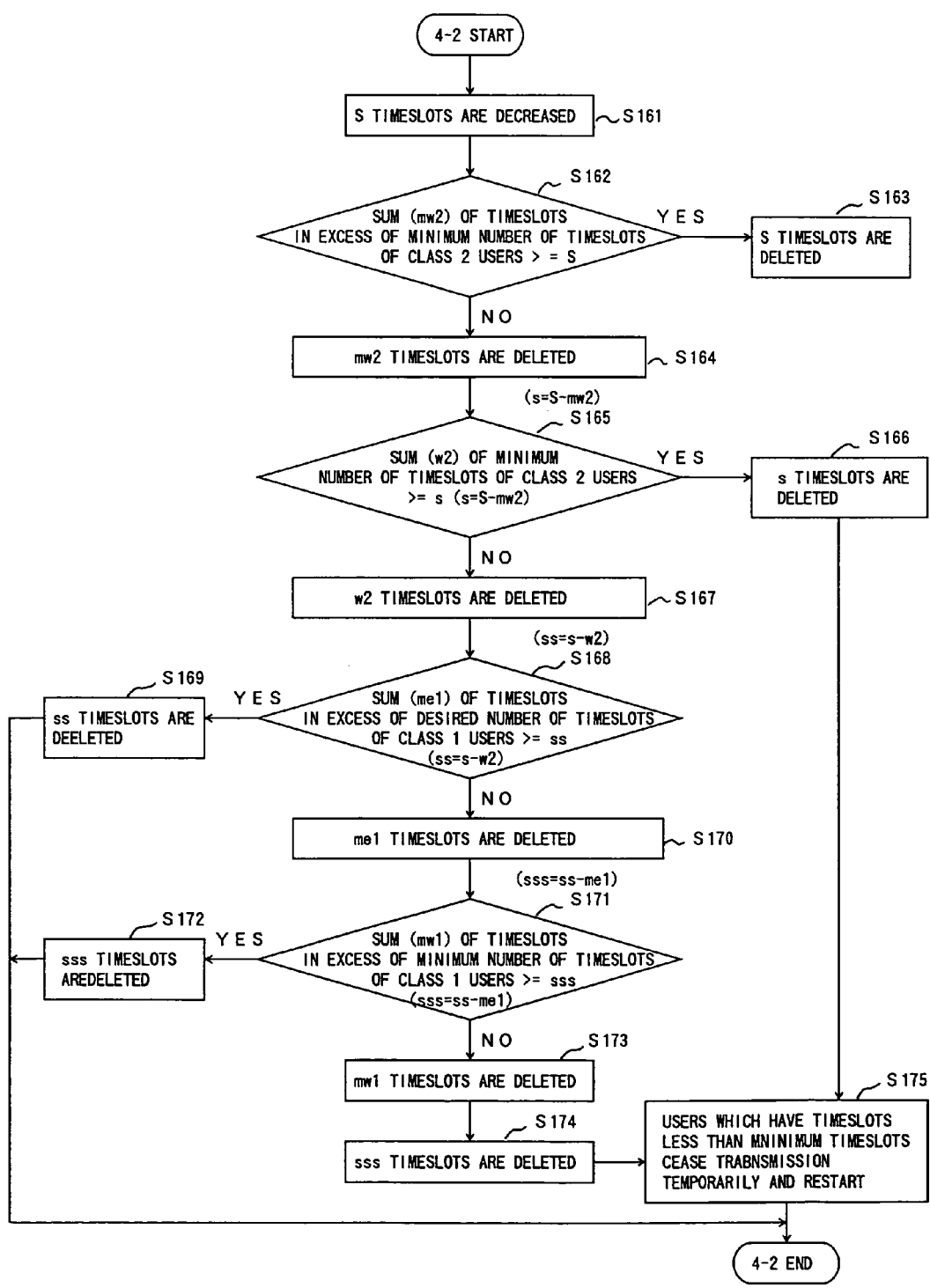
FIG. 25 is a flowchart showing timeslot number change when available resources decrease during data transmission according to the fourth embodiment of the present invention.
Figure 26:
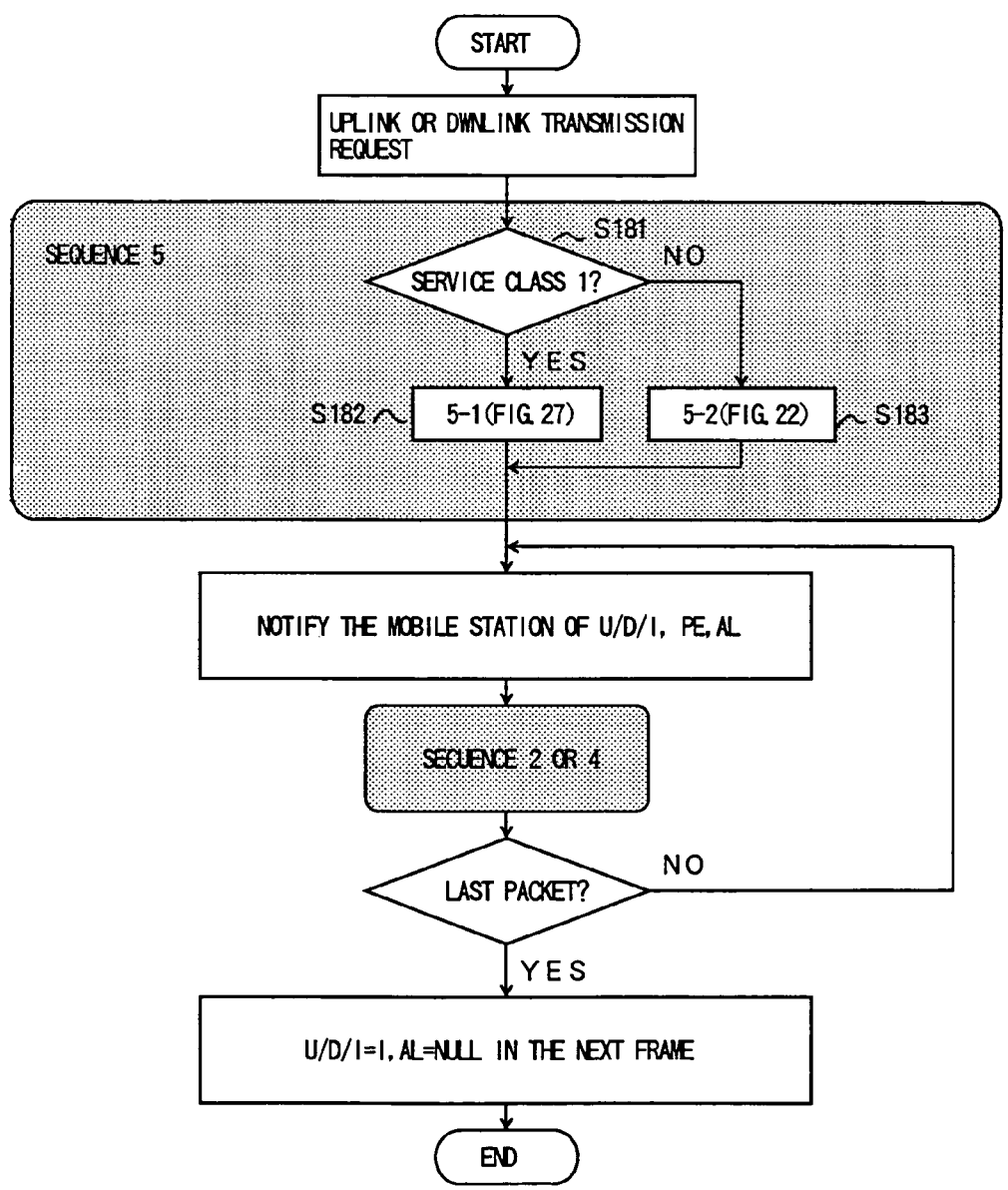
FIG. 26 is a flowchart showing the operation of the base station according to a fifth embodiment.

When there is a change in the available resources (YES in step 141), the base station checks whether the available resources increase in step 142. When the available resources increase, a process (4-1) shown in FIG. 24 is performed in step 143. When the available resources do not increase, a process (4-2) shown in FIG. 25 is performed in step 144.

Next, a process which is performed when there is at least a timeslot which is released or when system resources increase, that is, the process of the step 143 will be described with reference to a flowchart shown in FIG. 24.

The base station checks class 1 users having timeslots less than the desired number in step 151. Then, the base station assigns timeslots additionally for the class 1 users in decreasing order of the number of the shortage of timeslots with respect to the desired timeslots, wherein timeslots are assigned to each of the class 1 user until the number of timeslots becomes the desired number of timeslots in step 152. Instead, additional assignment can be performed randomly for class 1 users having less timeslots than the desired timeslots.

When one or more available timeslots remains after performing the above-mentioned assignment (YES in step 153), the base station checks whether there is any class 2 user which has less timeslots than minimum timeslots in step 154. Then, the base station assigns timeslots additionally for each of the class 2 users in descending order of the number of shortage of timeslots of the each class 2 user with respect to the minimum number of timeslots until the number of timeslots of each class 2 user becomes the number of minimum timeslots in step 155. Instead, assignment can be performed randomly to the class 2 users.

Next, processing in the case that available timeslots decreases, that is, the of the step 144 will be described with reference to a flowchart in FIG. 25.

As shown in FIG. 25, when S available timeslots decrease in step 161, timeslots are deleted in the following order, timeslots which are assigned in excess of the minimum number of timeslots for class 2 users (steps 162-164), minimum timeslots (step 165-167), timeslots which are assigned in excess of the desired number of timeslots of class 1 users (steps 168-170), timeslots which are assigned in excess of the minimum number of timeslots for class 1 users (steps 171-173), the minimum timeslots for the class 1 users (step 174).

When S timeslots are decreased in step 161, if the sum (mw2) of timeslots in excess of the minimum number of timeslots of the class 2 users is equal to or larger than S in step 162, S timeslots are deleted in descending order of the number of excess timeslots of each class 2 user in step 163. If mw2<S, mw2 timeslots are deleted in descending order of the number of excess timeslots in step 164. If the sum (w2) of the minimum number of timeslots of the class 2 users is equal to or larger than s (s=S−mw2) in step 165, s slots are deleted in descending order of the minimum number of timeslots in step 166. If NO in step 165, w2 timeslots are deleted from class 2 users in descending order of the minimum number of timeslots in step 167.

If the sum (me1) of timeslots in excess of desired number of timeslots of the class 1 users is equal to or larger than ss (ss=s−w2) in step 168, ss slots are deleted in descending order of the number of excess timeslots in step 169. If NO in step 168, me1 timeslots are deleted in descending order of the desired number of timeslots from the class 1 users in step 170. If the sum (mw1) of timeslots in excess of the minimum number of timeslots of the class 1 users is equal to or larger than sss (sss=ss−me1) in step 171, sss slots are deleted in descending order of the number of excess timeslots in step 172. If NO in step 171, mw1 timeslots are deleted in descending order of the number of excess timeslots in step 173. Then, sss timeslots are deleted in descending order of the minimum number of timeslots in step 174.

The user in which timeslots are deleted to less than the minimum number of timeslots ceases transmission and restarts when necessary available timeslots are assigned in step 175.

Each of the configuration of the mobile station and the base station is the same as those of the second embodiment which are shown in FIG. 18 and FIG. 19 respectively.

Fifth Embodiment

In the fifth embodiment, prioritization is performed for packet transmission and one or more timeslots are assigned by the QoS request according to traffic state at the time of packet transmission acceptance. The difference between the third embodiment and the fifth embodiment is as follows. In the third embodiment, quality for the class 2 user is degraded by priority when congestion occurs at the time of acceptance. On the other hand, in the fifth embodiment, timeslots which are assigned in excess of the minimum number of timeslots or the desired number timeslots are deleted in higher priority.

The configuration of a timeslot of the fifth embodiment is the same as that of the second embodiment shown in FIG. 14. A flowchart of the operation of the mobile station is the same as that of the second embodiment shown in FIG. 16.

A process for changing the timeslot number in the case that there is a change of available resources follows the sequence 2 or the sequence 4. In the following, a process of acceptance (sequence 5) will be described.

Figure 27:
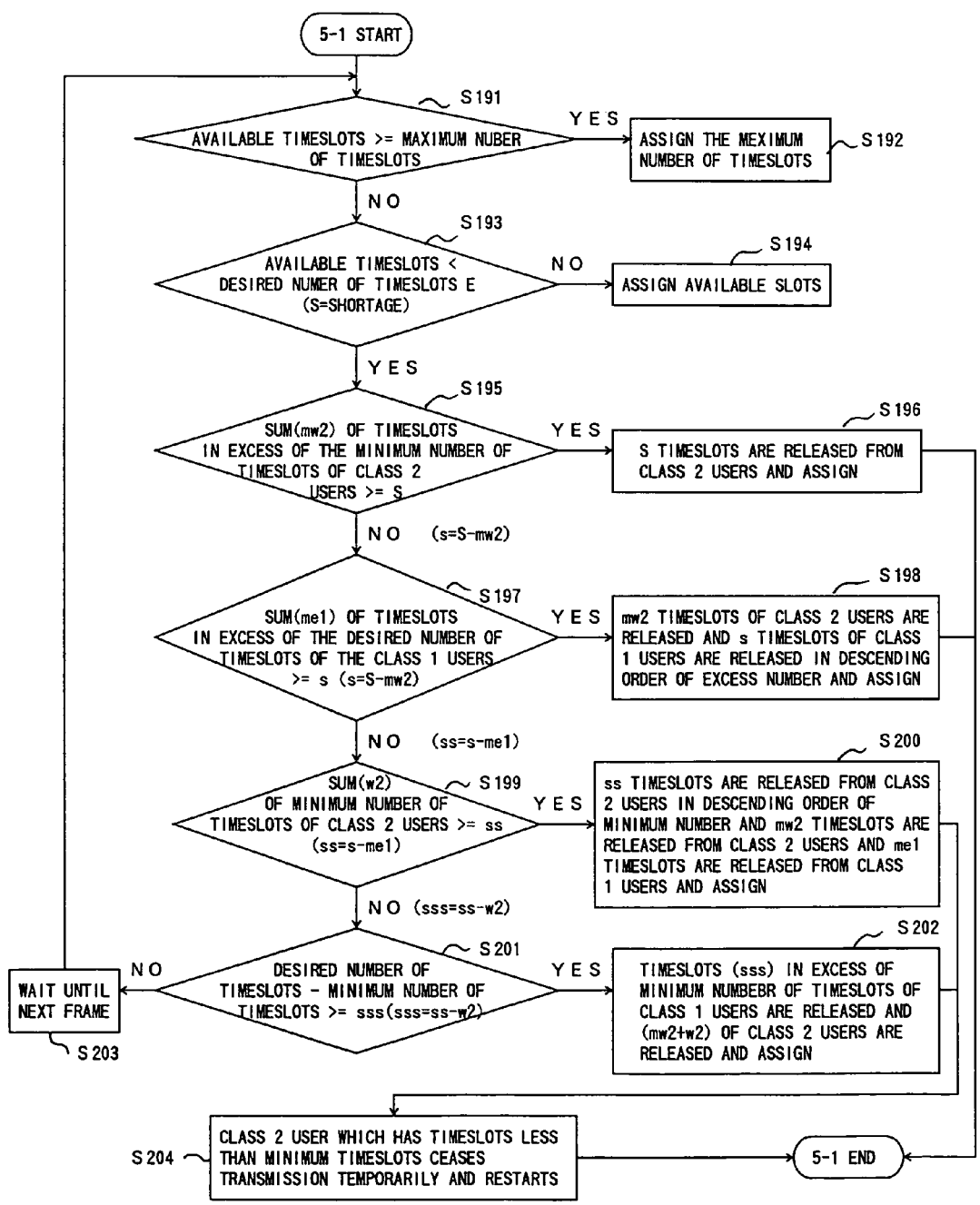
FIG. 27 is a flowchart showing timeslot assignment for a class 1 user according to the fifth embodiment.
Figure 29:
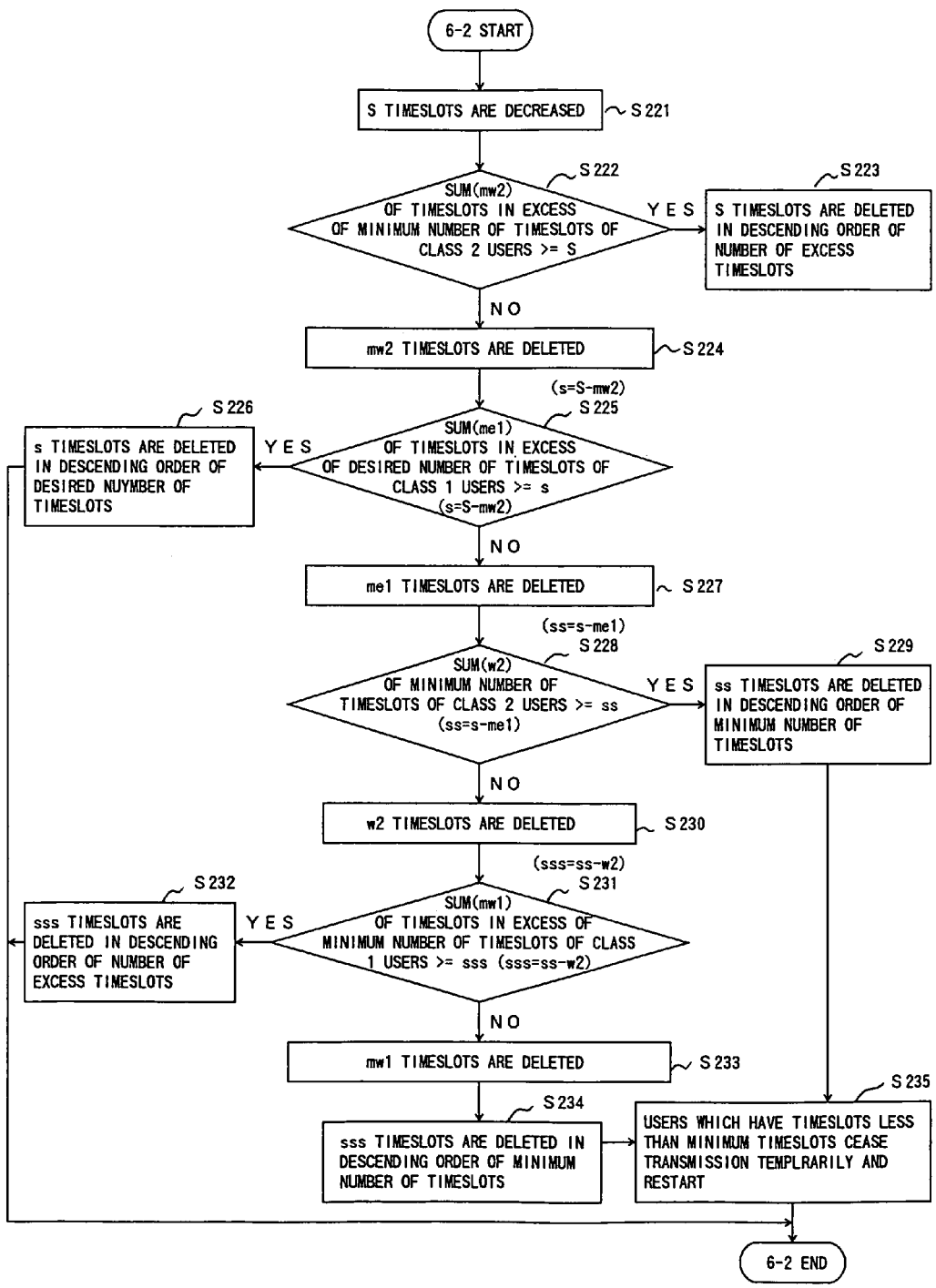
FIG. 29 is a flowchart showing timeslot number change when available resources decrease during data transmission according to the sixth embodiment.

When the service class is 1, a process (5-1) shown in FIG. 27 is performed in step 182. When the service class is not 1, the process (3-2) shown in FIG. 29 is performed in step 183.

Next, the method of timeslot assignment to a class 1 user will be described in the following with reference to FIG. 27. When the number of available timeslots is larger than the maximum number of timeslots (when YES in step 191), timeslots of the maximum number are allocated for the user in step 192. When the number of available timeslots is larger than the desired number of timeslots (when NO in step 193), the available timeslots are allocated for the user in step 134.

In the case of the number of available timeslots is smaller than the desired number of timeslots (when YES in step 193), timeslots are deleted and assigned to the new user in the following order, one or more timeslots which are assigned for the class 2 users in excess of the minimum number of timeslots for class 2 users (steps 195 and 196), one or more timeslots which are already assigned for each class 1 user in excess of desired number of timeslots (steps 197 and 198), minimum timeslots of class 2 users (steps 199 and 200), timeslots which are assigned in excess of the minimum number of timeslots (steps 201 and 202).

The operation for assigning timeslots to a class 2 user is the same as that shown in FIG. 22. Each of the configuration of the mobile station and the base station is the same as those of the second embodiment which are shown in FIG. 18 and FIG. 19 respectively.

Sixth Embodiment

In the sixth embodiment, prioritization is performed for packet transmission and the number of timeslots is changed according to a service class and a QoS request according to traffic state while packet transmission. The difference between the fourth embodiment and the sixth embodiment is as follows. In the fourth embodiment, quality of class 2 user is degraded in higher priority when congestion occurs in transmission. On the other hand, in the sixth embodiment, timeslots which are assigned in excess of the minimum number of timeslots or the desired number of timeslots are deleted in higher priority when congestion occurs in transmission.

The timeslot configuration of the fourth embodiment is the same as that of the second embodiment which is shown in FIG. 14. A flowchart of the operation of the mobile station is the same as that of the second embodiment shown in FIG. 16.

Figure 28:
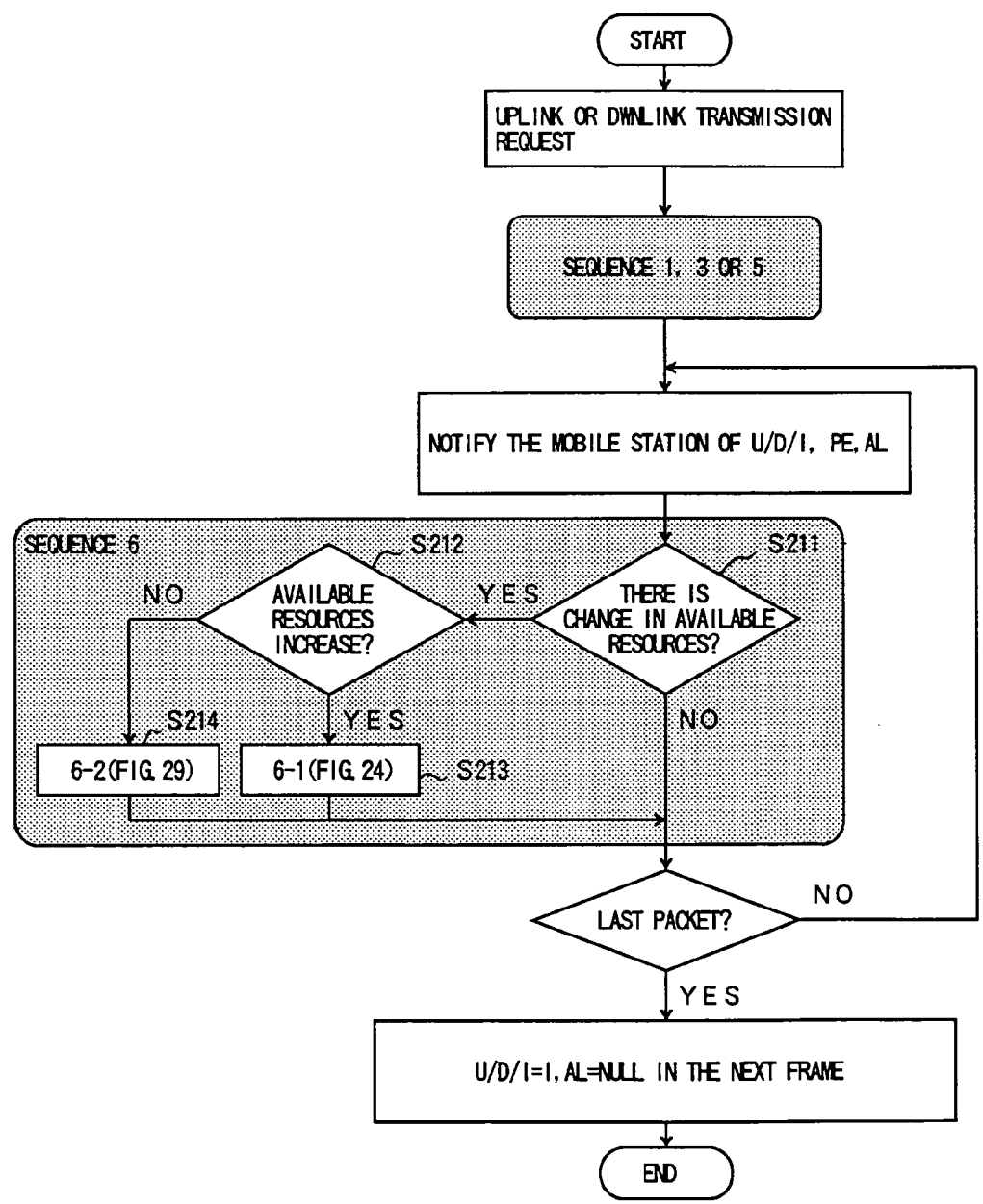
FIG. 28 is a flowchart showing the operation of the base station according to a sixth embodiment.

FIG. 28 is a flowchart showing the operation of the base station according to the sixth embodiment. A process in the case of available resources are changed is shown in the sequence 6 (steps 211-214). A process of the step 213, that is, the operation of the base station in the case of the available resources increase is the same as that shown in FIG. 24. In the following, a process of the step 214, that is, the operation of the base station in the case that available resources decrease will be described with reference to a flowchart shown in FIG. 29.

As shown in FIG. 29, when the number of available timeslots decreases in step 221, timeslots are deleted in the following order, that is, one or more timeslots which are assigned in excess of the minimum number of timeslots of the class 2 user (steps 222-224), one or more timeslots which are assigned in excess of the desired timeslot number for the class 1 user (step 225-227), the minimum number of timeslots for the class 2 users (steps 228-230), timeslots which is assigned in excess of the minimum number of timeslots for the class 1 users (steps 231-233), the minimum number of timeslots (step 234). The user in which timeslots are deleted to less than the minimum number of timeslots ceases transmission and restarts after a random time in step 235.

Each of the configuration of the mobile station and the base station is the same as those of the second embodiment which are shown in FIG. 18 and FIG. 19 respectively.

As mentioned above, according to the present invention corresponding to the second object, timeslots are allocated while allowing uplink/downlink conversion a plurality of times as requested instead of dividing timeslots into timeslots for uplink and timeslots for downlink as a conventional TDD system. Therefore, a timeslot assignment method can be realized in which timeslots can be allocated dynamically according to uplink/downlink traffic such that asymmetric traffic can be accommodates effectively.

In addition, service quality is categorized to service classes in which desired quality for a high class user is satisfied maximally and a best effort service is provided for a low class user according to excess of resources. Therefore, a timeslot assignment method can be realized in which timeslot assignment is performed according to the service class and allowance of resources. In addition, efficiency of timeslot use and throughput are improved and high service quality is provided maximally.

The present invention is not limited to the specifically disclosed embodiments, and variations and modifications may be made without departing from the scope of the invention.

What is claimed is:

1. A timeslot assignment method used for time division duplex in a mobile communication system which includes a base station and a mobile station, wherein, in a frame used in the mobile communication system, control mini-slots each of which corresponds to each timeslot in a next frame are provided, in which each of said control mini-slot includes at least an assignment state of a corresponding timeslot, said timeslot assignment method comprising:

said mobile station finding an idle timeslot of said next frame by checking information in said control mini-slots in said frame, and sending a slot assignment request to said base station by using said idle timeslot;

said base station assigning at least a timeslot based on said slot assignment request, and sending information including information of timeslot assignment to said mobile station by using a control mini-slot corresponding to said idle timeslot further comprising the steps of:

said base station receiving information including a desired number of timeslots in a duration of a frame;

when said slot assignment request indicates a predetermined service class and when a number of idle timeslots in said next frame is smaller than said desired number of timeslots, said base station assigning the idle timeslots and a part of timeslots that are assigned for another mobile station having a service class lower than the predetermined service class of said mobile station after releasing said part of timeslots; and when said number of idle timeslots in said next frame is larger than said desired number of timeslots, said base station assigning timeslots the number of which is larger than said desired number of timeslots and is equal to or less than a maximum number of timeslots indicated by said slot assignment request for said mobile station.

2. A timeslot assignment method used for time division duplex in a mobile communication system which includes a base station and a mobile station, wherein, in a frame used in the mobile communication system, control mini-slots each of which corresponds to each timeslot in a next frame are provided, in which each of said control mini-slot includes at least an assignment state of a corresponding timeslot, said timeslot assignment method comprising:

said mobile station finding an idle timeslot of said next frame by checking information in said control mini-slots in said frame, and sending a slot assignment request to said base station by using said idle timeslot;

said base station assigning at least a timeslot based on said slot assignment request, and sending information including information of timeslot assignment to said mobile station by using a control mini-slot corresponding to said idle timeslot further comprising:

when said slot assignment request indicates a predetermined service class and when at least an idle timeslot occurs during data transmission, said base station assigning the idle timeslot to said mobile station when a number of timeslots being assigned to said mobile station is less than a desired number of timeslots indicated by said slot assignment request, and when available timeslots decrease during data transmission, said base station deleting a part of timeslots assigned to another mobile station having a service class lower than said predetermined service class.

3. A base station in a mobile communication system using a time division duplex method which includes said base station and a mobile station, wherein, in a frame used in the mobile communication system, control mini-slots each of which corresponds to each timeslot in a next frame are provided, in which each of said control mini-slot includes at least an assignment state of a corresponding timeslot, said base station comprising:

means for receiving a slot assignment request from said mobile station by using an idle timeslot;

means for assigning at least a timeslot based on said slot assignment request, and sending information including information of timeslot assignment to said mobile station by using a control mini-slot corresponding to said idle timeslot;

means for receiving information including a desired number of timeslots in a duration of a frame; and means for, when said slot assignment request indicates a predetermined service class and when the number of idle timeslots in said next frame is smaller than said desired number of timeslots, assigning the idle timeslots and a part of timeslots that are assigned for another mobile station having a service class lower than the predetermined service class of said mobile station after releasing said part of timeslots; and means for, when said number of idle timeslots in said next frame is larger than said desired number of timeslots, assigning timeslots, the number of which is larger than said desired number of timeslots and is equal to or less than a maximum number of timeslots indicated by said slot assignment request for said mobile station.

4. A base station in a mobile communication system using a time division duplex method which includes said base station and a mobile station, wherein, in a frame used in the mobile communication system, control mini-slots each of which corresponds to each timeslot in a next frame are provided, in which each of said control mini-slot includes at least an assignment state of a corresponding timeslot, said base station comprising:

means for receiving a slot assignment request from said mobile station by using an idle timeslot;

means for assigning at least a timeslot based on said slot assignment request, and sending information including information of timeslot assignment to said mobile station by using a control mini-slot corresponding to said idle timeslot;

means for, when said slot assignment request indicates a predetermined service class and when at least an idle timeslot occurs during data transmission, assigning the idle timeslot to said mobile station when a number of timeslots being assigned to said mobile station is less than a desired number of timeslots indicated by said slot assignment request; and means for, when available timeslots decrease during data transmission, deleting a part of timeslots assigned to another mobile station having a service class lower than said predetermined service class.

5. A timeslot assignment method used for time division duplex in a mobile communication system which includes a base station and a mobile station, comprising:

said base station assigning at least a timeslot for a next frame in a frame time;

said base station sending information including information of timeslot assignments to said mobile station by using at least a control mini-slot, said base station receiving information including a desired number of timeslots in said frame time; and when said slot assignment request indicates a predetermined service class and when a number of idle timeslots in said next frame is smaller than said desired number of timeslots, said base station assigning the idle timeslots and a part of timeslots that are assigned for another mobile station having a service class lower than the predetermined service class of said mobile station after releasing said part of timeslots; and when said number of idle timeslots in said next frame is larger than said desired number of timeslots, said base station assigning timeslots the number of which is larger than said desired number of timeslots and is equal to or less than a maximum number of timeslots indicated by said slot assignment request for said mobile station.

6. A timeslot assignment method used for time division duplex in a mobile communication system which includes a base station and a mobile station, comprising:

said base station assigning at least a timeslot for a next frame in a frame time;

said base station sending information including information of timeslot assignment to said mobile station by using at least a control mini-slot;

when said slot assignment request indicates a predetermined service class and when at least an idle timeslot occurs during data transmission, said base station assigning the idle timeslot to said mobile station when a number of timeslots being assigned to said mobile station is less than a desired number of timeslots indicated by said slot assignment request; and when available timeslots decrease during data transmission, said base station deleting a part of timeslots assigned to another mobile station having a service class lower than said predetermined service class.

7. A base station in a mobile communication system using a time division duplex method which includes said base station and a mobile station, comprising:

means for assigning at least a timeslot for a next frame in a frame time;

means for sending information including information of timeslot assignment to said mobile station by using at least a control mini-slot;

means for receiving information including a desired number of timeslots in said frame time;

means for, when said slot assignment request indicates a predetermined service class and when the number of idle timeslots in said next frame is smaller than said desired number of timeslots, assigning idle timeslots and a part of timeslots that are assigned for another mobile station having a service class lower than the predetermined service class of said mobile station after releasing said part of timeslots; and means for, when said number of idle timeslots in said next frame is larger than said desired number of timeslots, assigning timeslots, the number of which is larger than said desired number of timeslots and is equal to or less than a maximum number of timeslots indicated by said slot assignment request for said mobile station.

8. A base station in a mobile communication system using a time division duplex method which includes said base station and a mobile station, comprising:

means for assigning at least a timeslot for a next frame in a frame time;

means for sending information including information of timeslot assignment to said mobile station by using at least a control mini-slot;

means for receiving information including a desired number of timeslots in said frame time; and means for, when said slot assignment request indicates a predetermined service class and when at least an idle timeslot occurs during data transmission, assigning the idle timeslot to said mobile station when a number of timeslots being assigned to said mobile station is less than the desired number of timeslots indicated by said slot assignment request; and means for, when available timeslots decrease during data transmission, deleting a part of timeslots assigned to another mobile station having a service class lower than said predetermined service class.

9. A base station in a mobile communication system using a time division duplex method which includes said base station and a mobile station, wherein, in a frame used in the mobile communication system, control mini-slots each of which corresponds to each timeslot in a next frame are provided, in which each of said control mini-slot includes at least an assignment state of a corresponding timeslot, said base station comprising:

a first receiving unit configured to receive a slot assignment request from said mobile station by using an idle timeslot;

a first assigning unit configured to assign at least a timeslot based on said slot assignment request, and send information including information of timeslot assignment to said mobile station by using a control mini-slot corresponding to said idle timeslot;

a second receiving unit configured to receive information including a desired number of timeslots in a duration of a frame;

a first releasing unit configured to, when said slot assignment request indicates a predetermined service class and when the number of idle timeslots in said next frame is smaller or larger than said desired number of timeslots, assign idle timeslots and a part of timeslots that are assigned for another mobile station having a service class lower than the predetermined service class of said mobile station after releasing said part of timeslots; and a second assigning unit configured to, when the number of idle timeslots in said next frame is larger than said desired number of timeslots, assign timeslots, the number of which is larger than said desired number of timeslots and is equal to or less than a maximum number of timeslots indicated by said slot assignment request for said mobile station.

10. A base station in a mobile communication system using a time division duplex method which includes said base station and a mobile station, wherein, in a frame used in the mobile communication system, control mini-slots each of which corresponds to each timeslot in a next frame are provided, in which each of said control mini-slot includes at least an assignment state of a corresponding timeslot, said base station comprising:

a receiving unit configured to receive a slot assignment request from said mobile station by using an idle timeslot;

a first assigning unit configured to assign at least a timeslot based on said slot assignment request, and send information including information of timeslot assignment to said mobile station by using a control mini-slot corresponding to said idle timeslot;

a second assignment unit configured to, when said slot assignment request indicates a predetermined service assignment class and when at least an idle timeslot occurs during data transmission, assign the idle timeslot to said mobile station when a number of timeslots being assigned to said mobile station is less than a desired number of timeslots indicated by said slot assignment request; and a first deleting unit configured to, when available timeslots decrease during data transmission, delete a part of timeslots assigned to another mobile station having a service class lower than said predetermined service class.

11. A base station in a mobile communication system using a time division duplex method which includes said base station and a mobile station, comprising:

a first assigning unit configured to assign at least a timeslot for a next frame in a frame time;

a sending unit configured to send information including information of timeslot assignment to said mobile station by using at least a control mini-slot;

a receiving unit configured to receive information including a desired number of timeslots in said frame time; and a first releasing unit configured to, when said slot assignment request indicates a predetermined service class and when the number of idle timeslots in said next frame is smaller or larger, respectively, than said desired number of timeslots, assign the idle timeslots and a part of timeslots that are assigned for another mobile station having a service class lower than the predetermined service class of said mobile station after releasing said part of timeslots; and a second assigning unit configured to, when said number of idle timeslots in said next frame is larger than said desired number of timeslots, assign timeslots, the number of which is larger than said desired number of timeslots and is equal to or less than a maximum number of timeslots indicated by said slot assignment request for said mobile station.

12. A base station in a mobile communication system using a time division duplex method which includes said base station and a mobile station, comprising:

a first assigning unit configured to assign at least a timeslot for a next frame in a frame time;

a sending unit configured to send information including information of timeslot assignment to said mobile station by using at least a control mini-slot;

a receiving unit configured to receive information including a desired number of timeslots in said frame time;

a second assignment unit configured to, when said slot assignment request indicates a predetermined service class and when at least an idle timeslot occurs during data transmission, assign the idle timeslot to said mobile station when a number of timeslots being assigned to said mobile station is less than the desired number of timeslots indicated by said slot assignment request; and a first deleting unit configured to, when available timeslots decrease during data transmission, delete a part of timeslots assigned to another mobile station having a service class lower than said predetermined service class.

* * * * *